US012726280B2

(12) United States Patent
Pompili et al.

(10) Patent No.: US 12,726,280 B2
(45) Date of Patent: Sep. 1, 2026

(54) TECHNIQUES FOR ADAPTIVE VIDEO MULTICASTS THROUGH ACOUSTIC CHANNELS IN UNDERWATER ENVIRONMENTS

(71) Applicant: RUTGERS, THE STATE UNIVERSITY OF NEW JERSEY, New Brunswick, NJ (US)

(72) Inventors: Dario Pompili, Hillsborough, NJ (US); Zhuoran Qi, Piscataway, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 19/127,156

(22) PCT Filed: Nov. 14, 2023

(86) PCT No.: PCT/US2023/079568
§ 371 (c)(1),
(2) Date: May 5, 2025

(87) PCT Pub. No.: WO2024/107676
PCT Pub. Date: May 23, 2024

(65) Prior Publication Data

US 2026/0163652 A1 Jun. 11, 2026

Related U.S. Application Data

(60) Provisional application No. 63/383,544, filed on Nov. 14, 2022.

(51) Int. Cl.
*H04B 13/02* (2006.01)
*H04N 21/2383* (2011.01)

(52) U.S. Cl.
CPC ......... *H04B 13/02* (2013.01); *H04N 21/2383* (2013.01)

(58) Field of Classification Search
CPC ............................ H04B 13/02; H04N 21/2383
See application file for complete search history.

(56) References Cited

U.S. PATENT DOCUMENTS

| | | | | |
|---|---|---|---|---|
| 2012/0030716 | A1* | 2/2012 | Zhang | H04N 21/43615 725/74 |
| 2021/0267006 | A1* | 8/2021 | Pezeshki | H04L 1/0003 |
| 2024/0289627 | A1* | 8/2024 | Tan | H04L 1/0009 |

* cited by examiner

*Primary Examiner* — Kyu Chae

(74) *Attorney, Agent, or Firm* — Wolter Van Dyke Davis, PLLC; Eugene Molinelli; Cian O'Brien

(57) ABSTRACT

Techniques for underwater video transmission include a model with a neural network encoder. The encoder outputs a class of physical-layer acoustic coding (AC). A training set includes a quality metric, an application layer video coding (VC) structure for that quality metric, and acoustic channel information such that reconstructed video features based on the class of AC are similar to original video features. First data that indicates the model is sent to a submersible with an underwater acoustic transceiver. The submersible determines second data including a current quality metric, a current VC structure and current acoustic channel information. The submersible generates third data that indicates the AC class output by the encoder operating on the second data. The submersible causes a current video stream to be transmitted as an underwater acoustic signal based on the second data and the third data.

10 Claims, 29 Drawing Sheets

Tx
Tx
CSI
MCS
434
Receiver, Rc
Channel Estimation
Physical-layer Demodulation
Cross-layer Adaptivity
SVC Decoder
Video Quality Satisfaction
438
SVC Structure
436
435
Required Video Quality
432
430
460
440

Algorithm 1 Transmitter-Side Processing for Unicast.

```
1:  Transmit(pilot);   t ← 0;
2:  while t < chunkTime do
3:     Receive(powerLow);
4:     if powerLow = True then
5:        Increase(transmitPower);  Goto 1
6:     end if
7:     Receive(MCS, SVC);
8:     videoStreams ← ScalableVideoCoding();
9:     Transmit(MCS, pilot, videoStreams);
10:    if t ≥ chunkTime then
11:       Goto 1    % Done transmitting this chunk
12:    end if
13: end while
```

FIG. 6A

Algorithm 2 Receiver-Side Processing.

```
1:  TrainML();
2:  t ← 0;
3:  while t < chunkTime do
4:     powerLow ← False;
5:     rx.pilot ← Receive();
6:     CSI ← EstimateCSI(rx.pilot);
7:     if CSI.SNR < SNR.threshold then
8:         powerLow ← True;
9:     Transmit(powerLow);  Goto 4
10:    end if
11:  Transmit(powerLow);
12:  BER.thresholds ← SVCselection(videoQuality);
13:  MCS ← MLclassify(CSI, BER.thresholds);
14:  Transmit(MCS, SVC);
15:  (MCS, rx.pilot, rx.videoStreams) ← Receive();
16:  SVClayers ← Decode(rx.videoStreamsHeader);
17:  SVCdecoding(SVClayers, videoQuality);
18:  if t ≥ chunkTime then
19:      Goto 2  % Done receiving this chunk
20:   end if
21: end while
```

FIG. 6B

Table 1: Parameters Setting for Experiments

| Parameter | Value |
|---|---|
| Symbol rate $f_S$ | 6 kBd |
| DAC sampling rate | 48 kHz |
| Number of samples per frame | 8 |
| Frequency band of LOON testbed | 8 - 14 kHz |
| ADC sampling rate | 128 kHz |
| Source modulation | QPSK |
| Modulation order $M$ | 2 |
| Number of symbols per symbol vector $K$ | 64 |
| Number of symbol vectors per frame $N$ | 3 - 6 |
| Number of Pilot vectors per frame | 1 |
| Length of GI or CP $L$ | 60 |
| Carrier frequency $f_C$ | 11 kHz |
| Number of transmitters | 1 |
| Number of transducers per transmitter | 1 |
| Number of receivers | 3 |
| Number of hydrophones per receiver | 1 |
| Sound power level re 1 pW | 175 - 180 dB |
| Turbo coding rate $R_{ch}$ | 1/3 |
| CDMA spread code length | 4 |

FIG. 7B

Table 2: Cases of Physical-Layer Modulations

| Case | Type | Parameter | $L_f$ | $\eta_f$[kbps] |
|---|---|---|---|---|
| # 1 | OFDM/OSDM<br>CDMA | $N = 3$ | 252 | 2.03<br>0.51 |
| # 2 | OFDM/OSDM<br>CDMA | $N = 4$ | 316 | 2.43<br>0.61 |
| # 3 | OFDM/OSDM<br>CDMA | $N = 5$ | 380 | 2.69<br>0.67 |
| # 4 | OFDM/OSDM<br>CDMA | $N = 6$ | 444 | 2.88<br>0.72 |

FIG. 7C

Table 3: SVC Encoder Specifications

| Part | Parameter | Value |
|---|---|---|
| Base Layer<br>(QP = 30) | Bitrate<br>SR | 5.6 kbps<br>320 x 184 |
| Quality Enhancement Layer<br>(QP = 26) | Bitrate<br>SR | 16.4 kbps<br>320 x 184 |
| Spatial Enhancement Layer<br>(QP = 26) | Bitrate<br>SR | 29.2 kbps<br>640 x 368 |
| AVC<br>(QP = 26) | Bitrate<br>SR | 29.2 kbps<br>640 x 368 |

FIG. 7D

Table 4: Target Y-PSNR (dB) at different users

| Time | M1 | M2 | M3 |
|---|---|---|---|
| 00 : 00 - 08 : 00 | > 40 | > 45 | > 45 |
| 08 : 00 - 09 : 30 | > 35 | > 35 | > 35 |
| 09 : 30 - 12 : 30 | > 40 | > 42 | > 42 |
| 12 : 30 - 15 : 00 | > 35 | > 35 | > 35 |

FIG. 7E

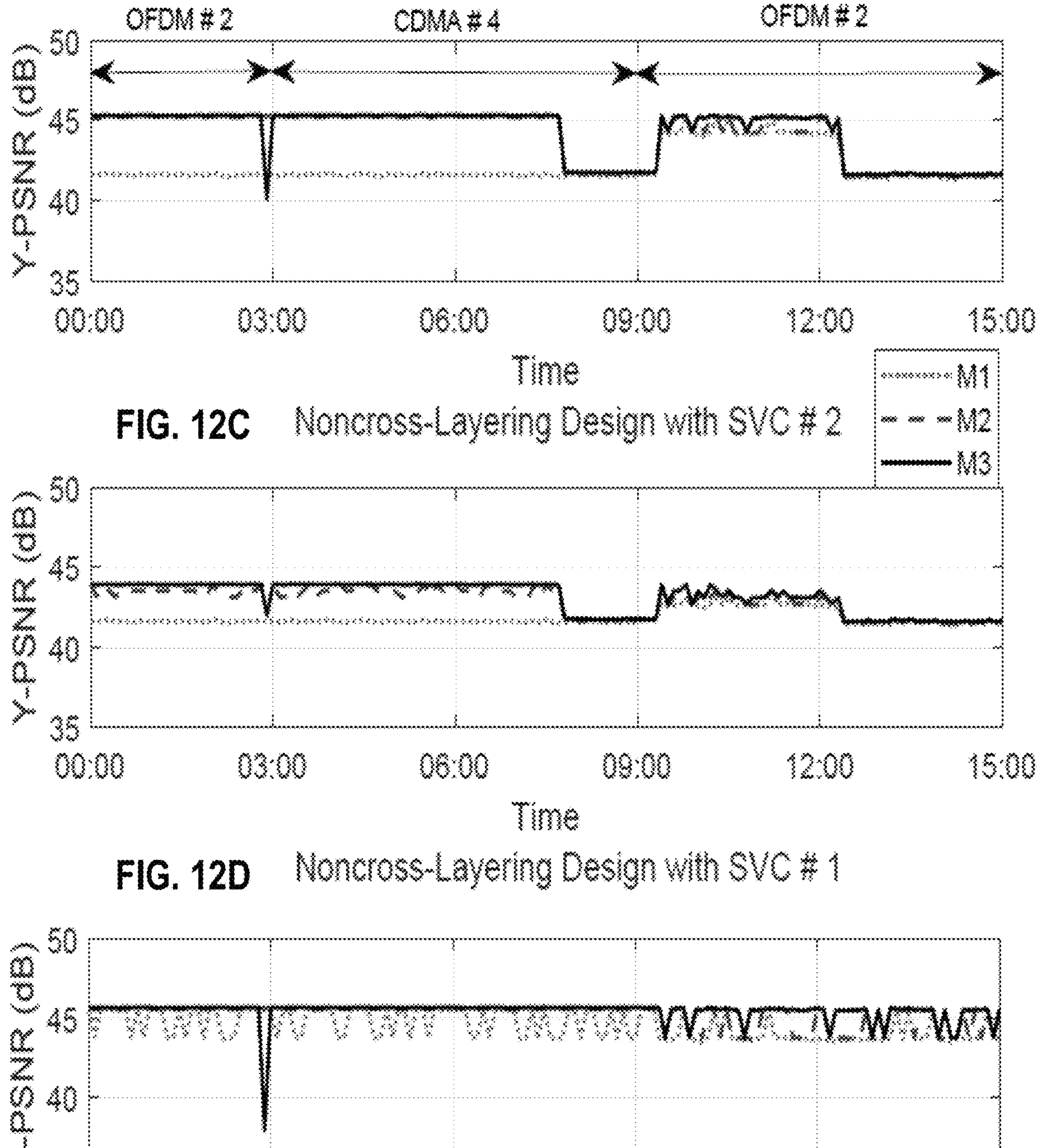
FIG. 12C Noncross-Layering Design with SVC # 2
FIG. 12D Noncross-Layering Design with SVC # 1
FIG. 12E Noncross-Layering Design with AVC Table 5: Parameters setting for USRP experiments.

| Parameter | Value |
|---|---|
| Distance | 10 m |
| Wind speed | 15 kt |
| Sampling frequency | 400 kHz |
| Frequency band | 50 – 150 kHz |
| Bandwidth of USRP testbed $B_w$ | 100 kHz |
| Symbol rate $R_s$ | 80 kBd |
| preAmp gain | 20 dB |
| powerAmp gain | 36 dB |
| Roll-off factor $\beta$ | 0.25 |

FIG. 13C

Table 6: Target Y-PSNR (dB) at different users.

| Time | User # 0 | User # 1 |
|---|---|---|
| 16 : 30 – 16 : 39 | > 35 | > 35 |
| 16 : 40 – 17 : 00 | > 35 | > 40 |

FIG. 13D

TECHNIQUES FOR ADAPTIVE VIDEO MULTICASTS THROUGH ACOUSTIC CHANNELS IN UNDERWATER ENVIRONMENTS

CROSS-REFERENCE TO RELATED APPLICATIONS

This application is a 371 National Stage Application of PCT Application No. PCT/US23/79568, filed Nov. 14, 2023, and claims benefit of Provisional Appln. 63/383,544, filed Nov. 14, 2022, the entire contents of which are hereby incorporated by reference as if fully set forth herein, under 35 U.S.C. § 119(e).

STATEMENT OF GOVERNMENTAL INTEREST

This invention was made with government support under Contract No. 1763964 awarded by the National Science Foundation. The government has certain rights in the invention.

BACKGROUND

The transmission of multimedia data such as text, images, audio and videos is useful and even enabling for those working in the field of underwater exploration, monitoring and operations as such data could provide vital information about the number, health and distribution of various species and machines in the underwater environment. However, such transmission is challenging because electromagnetic (radio and optical) systems have very limited range (on the order of tens of meters). The usage of the Underwater Wireless Optical Communication (UWOC) makes it possible to achieve high bandwidth within a communication distance of up to hundreds of meters. However, the UWOC suffers from water absorption and scattering effects caused by impurities in the water. Additionally, some alignments between the transmitter and receiver are required, and the quality of the communication link can be severely impaired by external factors, such as the presence of sources of reflection, e.g., bubbles. Acoustic signals traversing through an underwater acoustic channel are subject to narrow bandwidth and distortions due to varying interactions with the sea surface, varying interactions with the seafloor of varying depth, interference from other objects, varying acoustic noise, and varying acoustic channel conditions including temperature, salinity, current and current shear. Thus, the underwater acoustic channel is non-stationary on time scales relevant to usual communication applications, including the duration of many audio and video transmissions.

The underwater acoustic channel is usually modelled as a Rician fading channel for short-range shallow water communication (with a depth of less than 100 m, where the power of the Line-of-Sight, LOS, signal is stronger than the multipath delay signals due to reflections from the sea surface, sea floor, or other objects) as a special case of Rayleigh and Rice models.

Because of acoustic channel variability, a system that uses one kind of coding and modulation scheme for representing images, audio or video will underperform over an extended period of time and hence an adaptive system is desired, which can change its coding or transmission parameters or both based on the current underwater acoustic channel conditions.

Most of the work towards realizing such an adaptive communication protocol has been directed towards optimizing source coding and channel coding separately, or rather optimizing parameters of hand-made codes, such as Joint Photographic Experts Group (JPEG) coding for imagery and Turbo coding for transmission, among others.

SUMMARY

Techniques are provided for machine learning to devise advantageous representations of the multimedia source data based on the content of the source data or the conditions in the acoustic channel or both. Some of these techniques include an improvement on prior approaches to Joint Source-Channel Coding (JSCC).

In a first set of embodiments, a method for underwater video transmission includes training automatically on a processor a model that comprises a neural network encoder that outputs a value for a class of Modulating and Coding Schemes (MCS). The model is trained on a training set including for each instance an input value for a target quality metric, an input value indicating one of a plurality of scalable video coding (SVC) structures for that quality metric value, and an input value for acoustic channel information such that reconstructed video features based on the class of MCS output from the model are sufficiently similar to original video features for a particular purpose. The method includes sending first data that indicates the model to a processor on an underwater device that has an underwater acoustic transceiver. The underwater device is configured to determine second data that indicates a current quality value for the quality metric and a current channel value for the acoustic channel information and a current SVC value indicating one of the plurality of SVC modules. The underwater device is also configured to generate third data that indicates a current MCS value for the class of MCS, which value is output by the encoder of the first data operating on the second data. The underwater device is also configured to cause a current video stream to be transmitted as an underwater acoustic signal based on the second data and the third data.

In some embodiments of the first set, determining the current SVC value includes determining the current SVC value based on the current quality value and the current channel value using a different encoder trained on the training set. In some embodiments of the first set, receiving the first data and determining the second data and generating the third data is performed by an underwater receiver and causing the current video stream to be transmitted include transmitting the current SVC value and the current MCS value to an underwater transmitter to cause the underwater transmitter to transmit the underwater acoustic signal. In some embodiments of the first set, the original video features represent underwater video. In some embodiments of the first set, each instance input value for acoustic channel information indicates an amplitude shift and phase shift for each of one or more frequency shifts from a carrier acoustic frequency. In some embodiments of the first set, each instance input value for acoustic channel information indicates a numbered transceiver circuit tap for each of one or more frequency shifts from a carrier acoustic frequency.

In a second set of embodiments, a method for underwater video transmission includes training automatically on a processor a model that comprises a neural network encoder that outputs a value for a class of physical layer acoustic coding schemes (AC). The model is trained on a training set including for each instance an input value for a target quality metric, an input value indicating one of a plurality of application layer video coding (VC) structures for that quality metric value, and an input value for acoustic channel information such that reconstructed video features based on the class of AC output from the model are sufficiently similar to original video features for a particular purpose. The method includes sending first data that indicates the model to a processor on an underwater device that has an underwater acoustic transceiver. The underwater device is configured to determine second data that indicates a current quality value for the quality metric and a current channel value for the acoustic channel information and a current VC value indicating one of the plurality of VC structures. The underwater device is also configured to generate third data that indicates a current AC value for the class of AC, which value is output by the encoder of the first data operating on the second data. The underwater device is also configured to cause a current video stream to be transmitted as an underwater acoustic signal based on the second data and the third data.

In other sets of embodiments, a non-transient computer-readable medium or an apparatus or a neural network is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 6A is a flow chart expressed in example pseudocode for a method used at a video underwater transmitter, according to an embodiment;

FIG. 6B is a flow chart expressed in example pseudocode for a method used at a video underwater receiver, according to an embodiment;

FIG. 7B through FIG. 7E are tables that list properties of experiments associated with FIG. 7A, according to an embodiment;

FIG. 9A through FIG. 11C are plots similar to FIG. 8A through FIG. 8C, for three different experimental runs, according to an experimental embodiment;

FIG. 12C through FIG. 12E are plots that illustrate examples of quality performance when SVC structure does not depend on changing acoustic channel for the same three users for comparison;

FIG. 13C and FIG. 13D are tables that list properties of experiments associated with FIG. 13A, according to an embodiment;

DETAILED DESCRIPTION

A method and apparatus are described for using machine learning to detect and correct for variations in an underwater acoustic channel during underwater communications. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of communicating imagery or video source data through continental shelf sea water environments with bathymetric depths on the order of 100 meters (m) and modeled by Rician model for two or more submerged vehicles. However, the invention is not limited to this context. In other embodiments, the techniques used here apply to communications through saltwater or freshwater environments with both deeper or shallower bathymetric depths, with more or fewer, autonomous, or remote controlled or human occupied, submerged vehicles.

1. OVERVIEW OF MACHINE LEARNING

In various embodiments, machine learning, a branch of artificial intelligence, is used to detect or correct for variations in the underwater acoustic channel available during underwater communications. In its most general form, machine learning involves a model M that has one or more adjustable parameters P. The model M accepts available data X to produce a desired result Y, represented by the equation Y=M(P, X), where X, Y and P are sets of one or more elements. During machine learning, a training set that includes both X values and Y values, based on simulations or past experience or domain knowledge, are used to set values for one or more otherwise uncertain values for the adjustable parameters P.

Figure 1A:
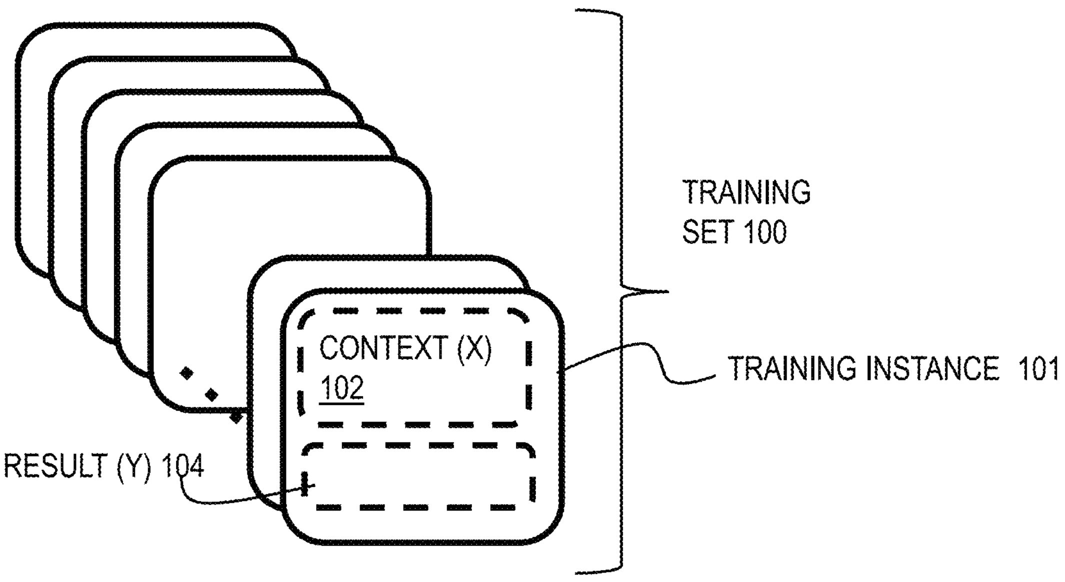
FIG. 1A is a block diagram that illustrates an example training set for machine learning.

FIG. 1A is a block diagram that illustrates an example training set 100, according to an embodiment. The training set 100 includes multiple instances, such as instance 101. The instances 101 for the training set 100 are selected to be appropriate for a particular operational purpose as explained in more detail in an appendix of this patent application. Each instance 101 includes a set of values 102 for context variables X expected to be available as input to a learned process, and includes a set of one or more values 104 for result variables Y expected to be provided by the learned process.

During machine learning, a model M is selected appropriate for the purpose and data at hand. One or more of the model M adjustable parameters P is uncertain for that particular purpose and the values for such one or more parameters are learned automatically. Innovation is often employed in determining which model to use and which of its parameters P to fix and which to learn automatically. The learning process is typically iterative and begins with an initial value for each of the uncertain parameters P and adjusts those prior values based on some measure of goodness of fit of its Model output $Y_M$ with known results Y for a given set of values for input context variables X from an instance 101 of the training set 100.

Figure 1B:
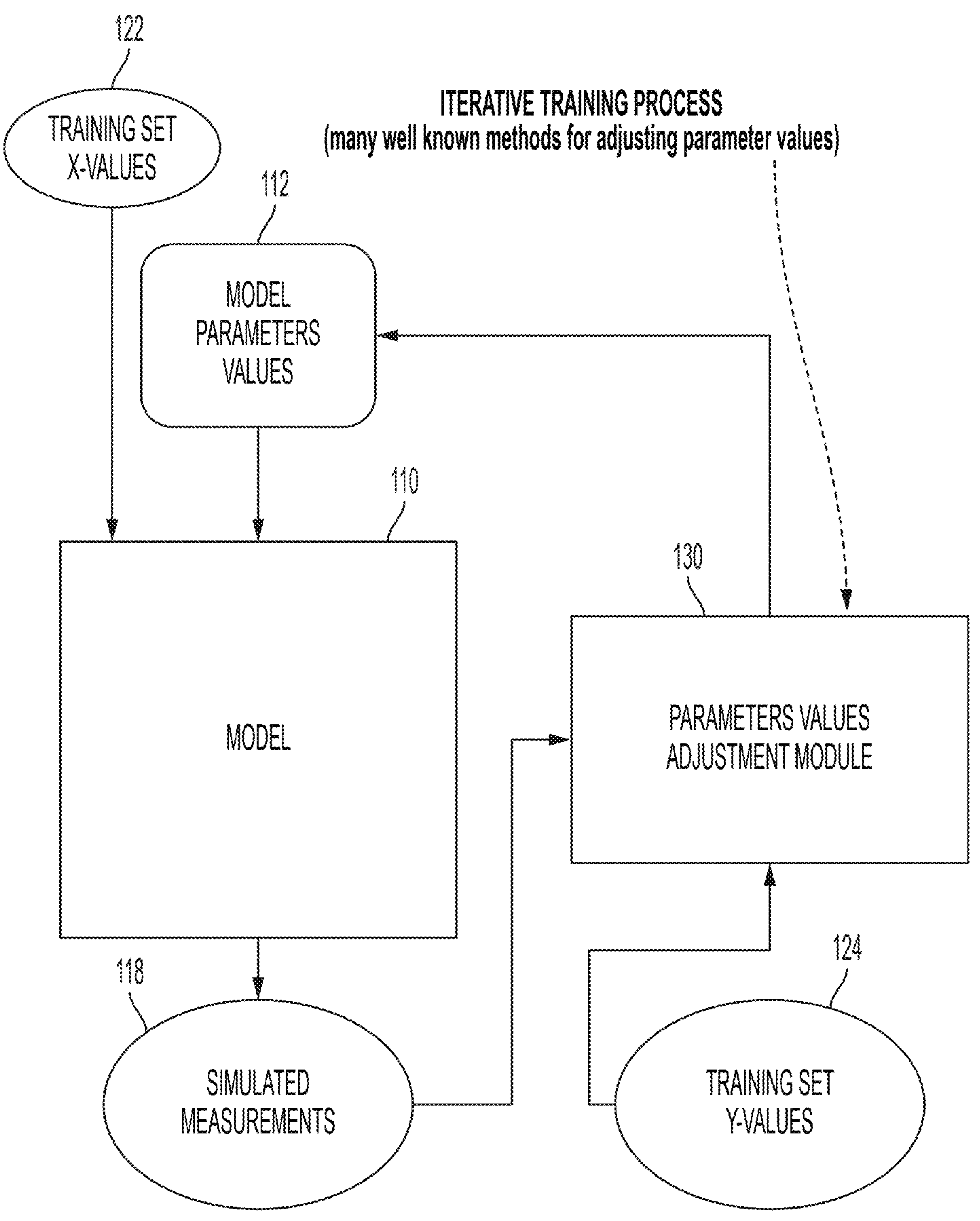
FIG. 1B is a block diagram that illustrates an example automatic process for learning values for parameters of a chosen model during machine learning, according to various embodiments.

FIG. 1B is a block diagram that illustrates an example automatic process for learning values for uncertain parameters P 112 of a chosen model M 110. The model M 110 can be a Boolean model for a result Y of one or more binary values, each represented by a 0 or 1 (e.g., representing FALSE or TRUE respectively), a classification model for membership in two or more classes (either known classes or self-discovered classes using cluster analysis), other statistical models such as multivariate regression or neural networks, or a physical model, or some combination of two or more such models. A physical model differs from the other purely data-driven models because a physical model depends on mathematical expressions for known or hypothesized relationships among physical phenomena. When used with machine learning, the physical model includes one or more parameterized constants, such as seafloor reflection coefficients, that are not known or not known precisely enough for the given purpose.

During training depicted in FIG. 1B, the model 110 is operated with current values 112 of the parameters P, including one or more uncertain parameters of P (initially set arbitrarily or based on order of magnitude estimates) and values of the context variables X from an instance 101 of the training set 100. The values 116 of the output $Y_M$ from the model M, also called simulated measurements, are then compared to the values 124 of the known result variables Y from the corresponding instance 101 of the training set 100 in the parameters values adjustment module 130.

The parameters values adjustment module 130 implements one or more known or novel procedures, or some combination, for adjusting the values 112 of the one or more uncertain parameters of P based on the difference between the values of $Y_M$ and the values of Y. The difference between $Y_M$ and Y can be evaluated using any known or novel method for characterizing a difference, including least squared error, maximum entropy, fit to a particular probability density function (pdf) for the errors, e.g., using a priori or a posterior probabilities. The model M is then run again with the updated values 112 of the uncertain parameters of P and the values of the context variables X from a different instance of the training set 100. The updated values 116 of the output $Y_M$ from the model M are then compared to the values of the known result variables Y from the corresponding instance of the training set 100 in the next iteration of the parameter values adjustment module 130.

The process of FIG. 1B continues to iterate until some stop condition is satisfied. Many different stop conditions can be used. The model can be trained by cycling through all or a substantial portion of the training set. In some embodiments, a minority portion of the training set 100 is held back as a validation set. The validation set is not used during training, but rather is used after training to test how well the trained model works on instances that were not included in the training. The performance on the validation set instances, if truly randomly withheld from the instances used in training, is expected to provide an estimate of the performance of the learned model in producing $Y_M$ when operating on target data X with unknown results Y. Typical stop conditions include one or more of a certain number of iterations, a certain number of cycles through the training portion of the training set, producing differences between $Y_M$ and Y less than some target threshold, producing successive iterations with no substantial reduction in differences between $Y_M$, and errors in the validation set less than some target threshold, among others.

Figure 2A:
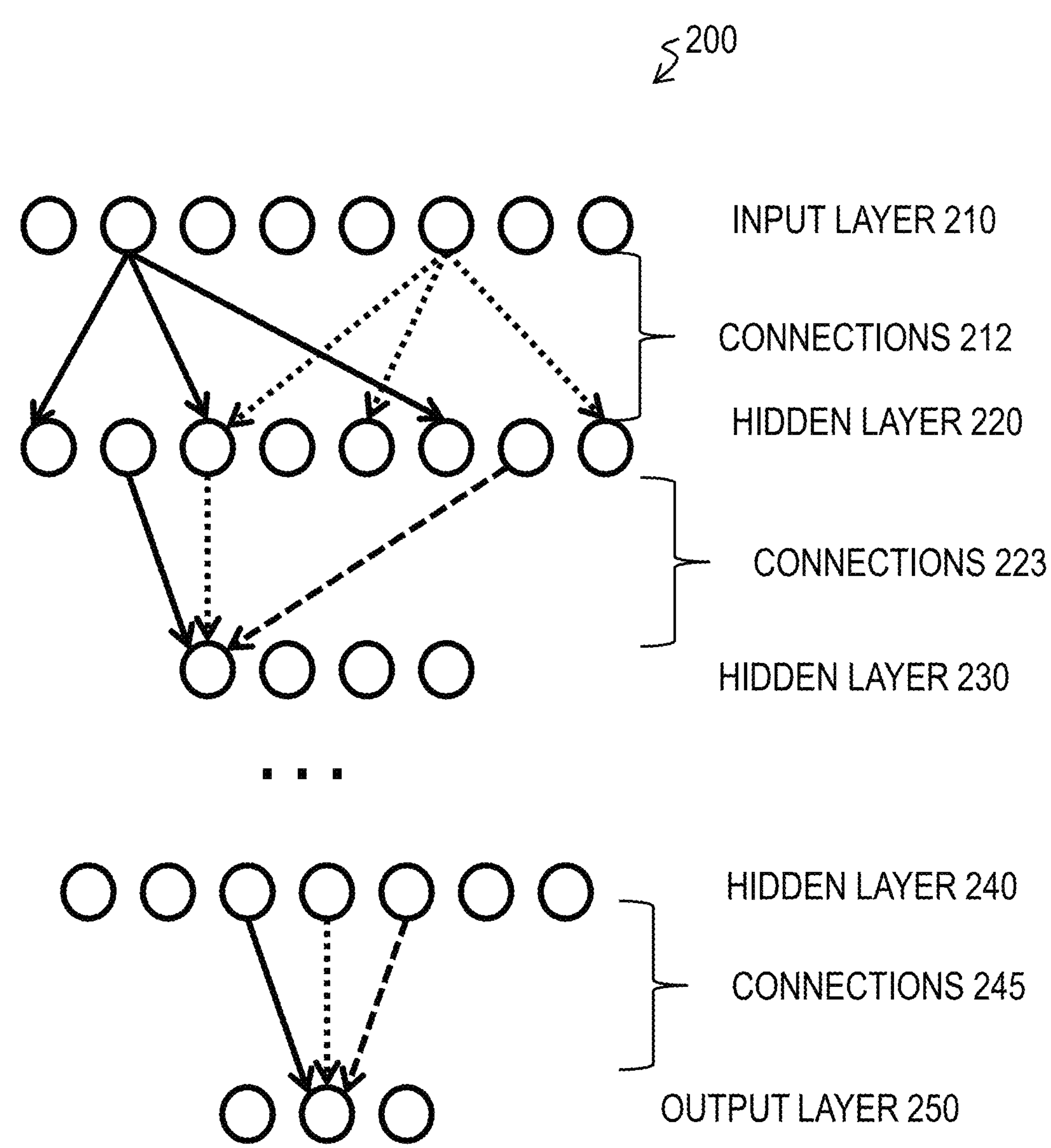
FIG. 2A is a block diagram that illustrates an example neural network 200 according to various embodiments.

In some embodiments, the model M is a neural network, widely used in image processing and natural language processing. FIG. 2A is a block diagram that illustrates an example neural network 200, according to various embodiments. A neural network 200 is a computational system, implemented on a general-purpose computer, or field programmable gate array, or some application specific integrated circuit (ASIC), or some neural network development platform, or specific neural network hardware, or some combination. The neural network is made up of an input layer 210 of nodes, at least one hidden layer such as hidden layers 220, 230 or 240 of nodes, and an output layer 250 of one or more nodes. Each node is an element, such as a register or memory location, that holds data that indicates a value. The value can be code, binary, integer, floating point or any other means of representing data. In common forms of neural networks, values in nodes in each successive layer after the input layer in the direction toward the output layer is based on the values of one or more nodes in the previous layer. The nodes in one layer that contribute to the next layer are said to be connected to the node in the later layer. Example connections 212, 223, 245 are depicted in FIG. 2A as arrows. The values of the connected nodes are combined at the node in the later layer using some activation function with scale and bias (also called weights) that can be different for each connection. Neural networks are so named because their nodes are modeled after the way neuron cells are connected in biological systems. A fully connected neural network has every node at each layer connected to every node at any previous or later layer or both.

Figure 2B:
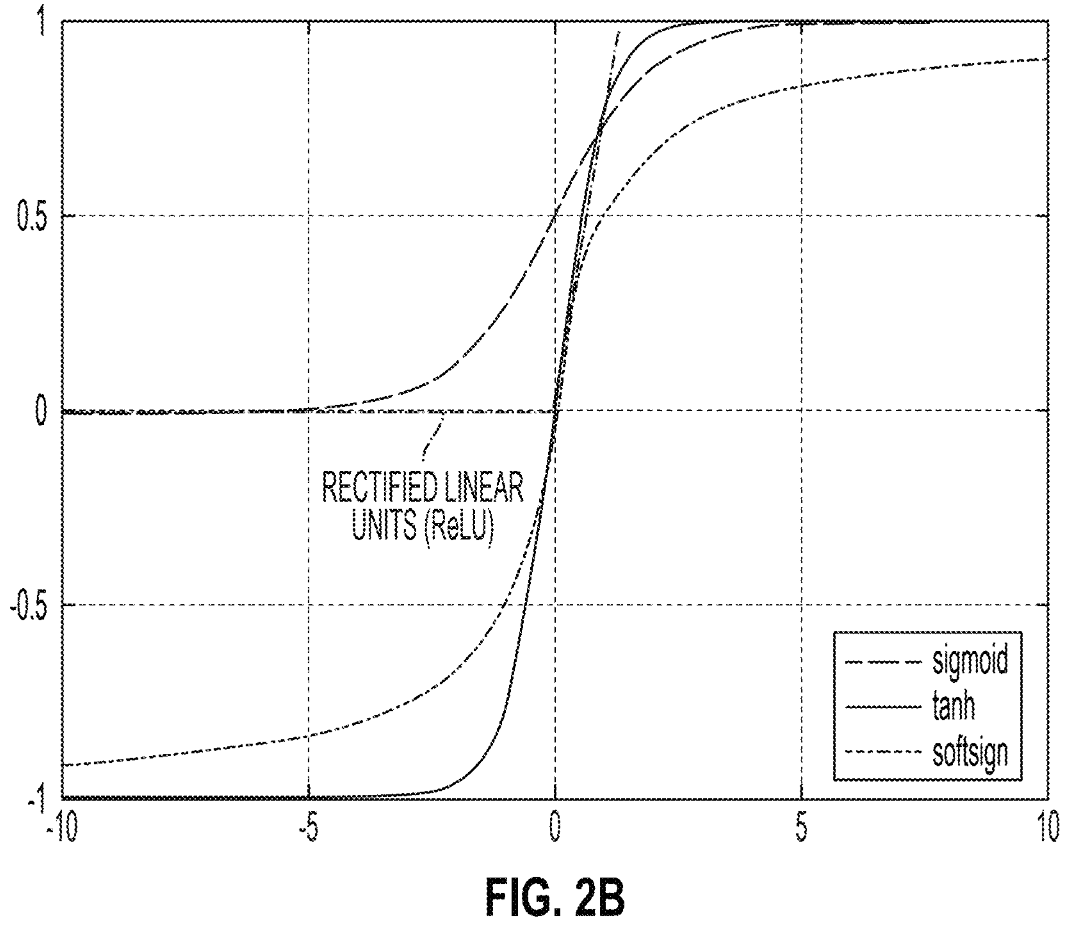
FIG. 2B is a plot that illustrates example activation functions used to combine inputs at any node of a neural network, according to various embodiments.

FIG. 2B is a plot that illustrates example activation functions used to combine inputs at any node of a neural network. These activation functions are normalized to have a magnitude of 1 and a bias of zero; but when associated with any connection can have a variable magnitude given by a weight and centered on a different value given by a bias. The values in the output layer 250 depend on the values in the input layer and the activation functions used at each node and the weights and biases associated with each connection that terminates on that node. The sigmoid activation function (dashed trace) has the properties that values much less than the center value do not contribute to the combination (a so called switch effect, switching on when traversing the plot from left edge to center, and switching off when traversing the plot from center to left edge) and large values do not contribute more than the maximum value to the combination (a so called saturation effect), both properties frequently observed in natural neurons. The tanh activation function (solid trace) has similar properties but allows both positive and negative contributions. The softsign activation function (short dash-dot trace) is similar to the tanh function but has much more gradual switch and saturation responses. The rectified linear units (ReLU) activation function (long dash-dot trace) simply ignores negative contributions from nodes on the previous layer but increases linearly with positive contributions from the nodes on the previous layer; thus, ReLU activation exhibits switching but does not exhibit saturation. In some embodiments, the activation function operates on individual connections before a subsequent operation, such as summation or multiplication; in other embodiments, the activation function operates on the sum or product or other mathematical or logical or textual operation on the values in the connected nodes. In other embodiments, other activation functions are used, such as kernel convolution.

Some neural networks are used that remember past layer contents and are useful in feedback, recursive and accumulation circuits. Such networks are called recurrent neural networks (RNN). Long Short-Term Memory (LSTM) registers have been useful in implementing such RNN. LSTM networks are a type of RNN that has an internal state that can represent context information. They keep information about past inputs for an amount of time that is not fixed a priori, but rather depends on its weights and on the input data.

An advantage of neural networks is that they can be trained as a model M to produce a desired output from a given input without knowledge of how the desired output is computed. There are various algorithms known in the art to train the neural network on example inputs with known output, such as back propagation. The adjustable parameters P include the number of layers, the number of nodes in each layer, the connections, the operation at each node, the activation function and the weight and bias at each node. Typically, however, the number of layers, number of nodes per layer, the connections and the activation function for each node or layer of nodes is predetermined, and the training determines the weight and bias for each connection or at each node on each layer, so that weights and biases for all nodes constitute the uncertain parameters of P. A trained network that provides useful results, e.g., with demonstrated good performance for known results during validation, is then used in operation on new input data not used to train or validate the network.

In some neural networks, the activation functions, weights and biases, are shared for an entire layer. This provides the networks with shift and rotation invariant responses especially useful for identifying features, such as holes or objects, anywhere and oriented at any angle in an image. The hidden layers can also consist of convolutional layers, pooling layers, fully connected layers and normalization layers. The convolutional layer has parameters made up of a set of learnable filters (or kernels), which have a small receptive field, i.e., are connected to just a few nodes of the previous layer. In image processing the small receptive field is usually a few contiguous nodes in an area of an image represented by the previous layer, as in the visual system of an animal eye. In a pooling layer, the activation functions perform a form of non-linear down-sampling, e.g., producing one node with a single value to represent four nodes in a previous layer. There are several non-linear functions to implement pooling among which max pooling is the most common. A normalization layer simply rescales the values in a layer to lie between a predetermined minimum value and a predetermined maximum value, e.g., 0 and 1, respectively.

It has been found that neural networks of limited output layer size provide advantages in recognizing contents of images.

A method for machine learning includes selecting the training set, the variables that will serve as context input X and result output Y, a model M, and the model's certain (fixed) and uncertain (adjusted automatically during machine learning), parameters $P_F$ and $P_L$, respectively, of model parameters, $P=P_F \cup P_L$. The training set T is then divided into a training subset $T_T$ with the majority of instances and a validation subset $T_V$ with the remaining instances, such that $T=T_T \cup T_V$. Values for $P_L$ are determined by applying the method of FIG. 1B on the training subset $T_T$. The $P_L$ values are validated by using them on the validation set $T_V$, provided that the differences between $Y_M$ and the Y for the validation set $T_V$ is acceptably small, e.g., have mean square error (MSE) less than a desired threshold or have a distribution that satisfies desired characteristics, e.g., maximum entropy. If not validated, then control returns to earlier steps to revise the training set T, e.g., by acquiring more instances, or revising the model M, or revising the set of adjustable parameters $P_L$ or some combination If validated, then the model is used with the current values for P, on new operational data, Xo to produce operational results Yo. In some embodiments, where Yo can be subsequently or eventually determined to obtain Yod, the values of Xo and Yod are randomly or consistently added to the training set T and the parameters $P_L$ are updated using a new subset of $T_T$ of the updated T.

2. ADAPTIVE SCALABLE VIDEO CODING

Modulation and Coding Schemes (MCS), at a physical layer of a communication stack for video are known but assume a fixed video quality and constant propagation medium during transmission of video. This is not reliable when the video quality could be reduced or the video duration exceeds the coherence time of the propagation medium. Scalable Video Coding (SVC), at an application layer of a communication stack, has been widely used in video transmissions by breaking a video stream into sub-streams of multiple layers (SVC structures) with different degrees of enhancement. However, inappropriate SVC structures may lead to received video quality lower than a user's target or higher quality than the user's targets, leading to resource waste, especially in underwater time-varying channels. SVC has never been used in underwater transmissions (but only in terrestrial Radio Frequency transmissions), precisely for these reasons—the challenges affecting the underwear acoustic channel (time variability, Doppler effect, and heavy multipath). These represent underwater acoustic channel impediments to implementing SVC. If such impediments are not compensated or equalized, multimedia transmission in general and SVC video in particular become very brittle (easily broken) and unreliable.

Therefore, a fixed physical-layer transmission scheme cannot balance the system robustness and throughput in a time-varying channel. Moreover, high enhancement layers in a fixed SVC structure are excessive because they are inclined to be discarded due to users' low video quality targets, which amounts to a waste of resources. When transmitting video streams, the transmitter also transmits information about MCS and SVC, so the receiver also knows the propagation time of video with different quality.

An acoustic receiver can detect its own local acoustic channel conditions in various ways. Pilot messages are known symbols or images or video clips that the receiver uses to determine channel status. The ratio of data bits to pilot bits in a message frame is set to ensure at least some pilot bits during a coherence time interval. Use of pilot bits becomes costly and unfeasible to track channel changes if channel coherence time Tc decreases too much because this leads to a lower ratio and thus a lower throughput. The MCS addresses it by inserting pilot sequences into data, in the following way: if the interval between two pilot sequences is shorter than the channel coherence time Tc, the channel can be estimated. Conversely, if the coherence time is shorter, more pilot sequences are inserted so that the interval between two pilot messages gets shorter so as to be able to recompute the channel properties and better estimate the actual channel conditions.

2.1 Models to Train

In various embodiments, the acoustic channel information includes one or more of an observed channel signal to noise ratio (SNR) and Channel State Information (CSI) data, either observed directly by the transmitter or conveyed in a separate text message from the receiver. In some embodiments, the CSI data includes a complex number, indicating amplitude gain (negative gain indicates loss) and phase shift by the real and imaginary parts, respectively, for each of one or more acoustic frequency shifts from a carrier acoustic frequency. Experience has associated such amplitude and phase shifts with corresponding correction circuits, each accessed by a different numbered tap of a transceiver device. Such taps are well known for any acoustic transceiver system. Thus, in some embodiments, the CSI data is a tap number for each of one or more acoustic frequency shifts from the carrier acoustic frequency. In some embodiments, the channel is characterized using probability distribution functions (PDFs) like Rayleigh or Rician random variables. Such PDFs can then be used in simulations to expand the space of limited channel observations that could be obtained from live experiments (channel augmentation), e.g., to account for physical perturbations (wind, waves, seasons, etc.) based on known physical models and spatial changes.

An acoustic receiver can determine its own demands for video quality in various ways. For example, to ensure the quality of the received video, a Bit Error Rate (BER) threshold to limit the distortion caused by random error bits is set by the receiver and communicated to the transmitter. This includes determining a relationship between the BER and SVC video quality metrics. Different video quality metrics set by the receiver often do not include BER but rather include Luminance Peak Signal to-Noise Ratio (Y-PSNR), Structural Similarity (SSIM) and Mean Opinion Score (MOS).

In these embodiments, the model M is used to communicate through the underwater acoustic channel so that the received reconstructed video Y is about the same as the original source video within the quality targets set by the receiver in the training set T. Thus, X includes $X_S$ and $X_A$ and $X_Q$, where $X_S$ is the source data and $X_A$ is the acoustic channel information and $X_Q$ is the quality of the video demanded by the receiver, e.g., $X=X_S \cup X_A \cup X_Q$. So, in each instance of the training set $Y=q(X_Q,X_S)$ where q is a function that transforms $X_S$ to a quality given by $X_Q$ (e.g., subsamples at ¼ resolution).

In some embodiments, the training is only about the CSI, BER, and MCS. In these embodiments, the training set, X is CSI and BER, and Y is MCS. The video reconstruction SVC is decided according to the required video quality by mapping the physical-layer BER to the application-layer video quality metrics (e.g., PSNR, SSIM, MOS). If, say, $X_B$ is the BER threshold, $X_B=f(X_Q, X_S)$, where f( ) is the function of mapping physical-layer BER to application-layer video quality metrics, which isn't trained together with CSI. In $Y=MCS=q(X_B, X_A)$, $X_A$ is the acoustic channel information, also called channel state information (CSI).

The model M includes a transmitter model $M_T$ and a receiver model $M_R$ and an acoustic channel distortion model $M_A$, so $M=M_T \cup M_A \cup M_R$. $M_T$ is used to convert X to a form $X_T=M_T(P_T, X)=MCSs(X_S)$, where $P_T$ are the learned parameters of the transmitter model $M_T$, $MCSs(X_S)$ transforms $X_S$ (after conversion to SVC structures) using MCS class s, and class s is output by $M_T$. The class s depends both on the source video and the quality demands $X_Q$ set by the receiver(s) and the properties of the acoustic channel at the receiver(s) $X_A$. For example, if the SNR provided in $X_A$ is too low, an amplitude of the transmitted signal $X_T$ is increased. In some embodiments, $P_T$ is used only to convert $X_A$ and $X_Q$ into class s. In some embodiments, $M_T$ includes a neural network.

$M_A$ is used to transform $X_T$ to $X_R$ received at the receiver, and, in some embodiments, is a physics based model, such as the Rician model, without adjustable parameters, using only some or all of $X_A$ as input. In some embodiments, the model $M_A$ includes one or more adjustable parameters $P_A$. In general $X_R=M_A(P_A, X_A, X_T)$.

$M_R$ is used to convert the received data $X_R$ into a best achievable approximation of the source data $Y_M=M_R(X_R)\approx q(X_Q,X_S)$. Note that there are no adjustable parameters $P_R$. $Y_M$ depends only on the received data $X_R$ and the SVC encoding and the MCS indicated by class s. In many embodiments, the received signal $X_R$ can be used to derive properties of the acoustic channel $X_A$.

All uncertain parameters of the model M, including $P_T$, $P_A$ and $P_R$ are learned together, i.e., joint machine learning. Such embodiments for underwater acoustic communications use a method depicted in FIG. 3. In many embodiments, the only adjustable parameters are $P_T$, i.e., all parameters of $M_A$ and $M_R$ are known and all inputs available.

In various embodiments, the trained models are implemented as one or more modules of computer hardware or software or some combination.

2.2 Method to Train and Use Models

In some embodiments, while training (either offline before deployment, or online re-training), the features are transmitted/received using complex channel gains collected during live experiments, thereby making the neural network aware of the observed channel conditions. Using these characterizations, the neural network could be trained for a wide variety of channel conditions (this likely increasing its generalization capability). In some embodiments, the estimated channel gains at the receiver, denoted by CSI, are sent back to the transmitter for variable length transmissions, as described in the examples section. The receiver estimates the channel tap gains for each pilot symbol, Physical layer transmission protocols indicated by MCS class s, include Code Division Multiple Access (CDMA), Orthogonal Frequency Division Multiplexing (OFDM), and Orthogonal Signal-Division Multiplexing (OSDM)

To address these issues with current implementations of SVC, either physical-layer transmission schemes are selected adaptively according to the CSI, or transmitting redundant enhancement layers are avoided while satisfying the video quality targets, or both. Thus, the techniques presented herein select the MCS and the SVC video encoding method at the transmitter based on feedback from one or more receivers, including the estimated CSI and the video quality targets at each receiver. In some embodiments the transmitter determines SVC structure and MCS class based on CSI and target video quality, the latter two may be provided by transmitter or receiver or some combination). Decision-making at the transmitter requires accurate and timely Channel State Information (CSI) feedback since errors or loss of CSI packets can result in suboptimal selections. To address these issues, some embodiments aim at (i) selecting physical-layer transmission schemes adaptively according to the CSI at the receiver, (ii) avoiding transmitting redundant enhancement layers while satisfying the video quality targets, and (iii) feeding back selected transmission scheme indexes instead of CSI to the transmitter. Thus, in these embodiments, including the example embodiments, the receiver selects the target quality and uses the receiver perceived CSI to determine SVC structure and MCS class, using the trained models, and sends MCS and SVC information to the transmitter to deploy in transmission intended for that receiver. This way each receiver can set a different quality under different channel conditions.

Figure 3:
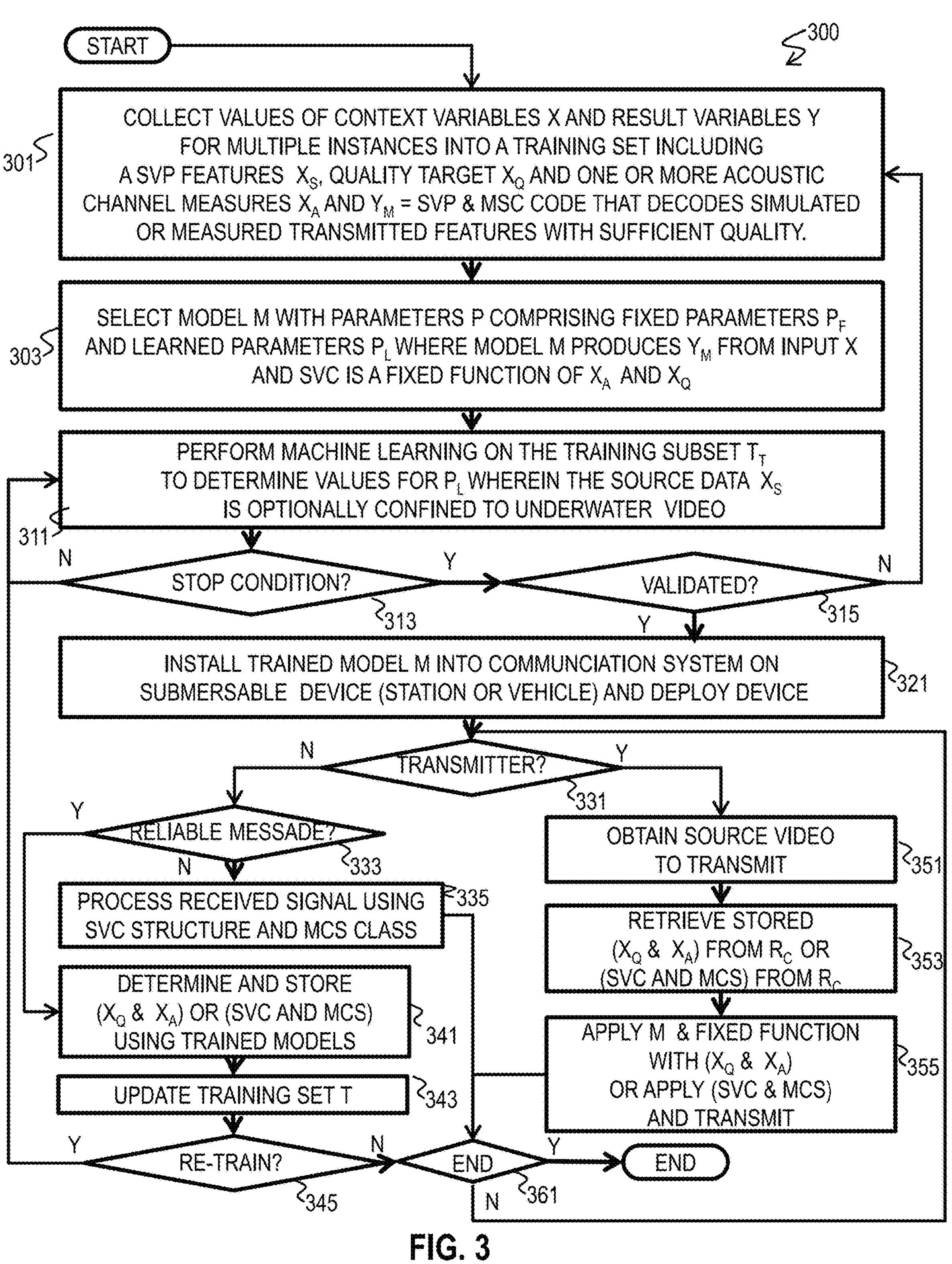
FIG. 3 is a flow diagram that illustrates an example method for performing underwater acoustic communications, according to an embodiment.

FIG. 3 is a flow diagram that illustrates an example method for performing underwater acoustic communications, according to an embodiment. Although steps are depicted in FIG. 3 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 301, values of context variables X and result variables Y for multiple instances are collected into a training set T including a training subset $T_T$ and a validation subset $T_V$. Here X includes a quality metric $X_Q$ such as tolerable bit error rate (BER) and SVC structure $X_S$ to satisfy that quality metric, and X includes one or more acoustic channel measures $X_A$, also called Channel State Information (CSI) in example embodiments, such as noise, attenuation, frequency shifts, or Rician channel feature values such as water depth or multipath delays or relative amplitudes, or decorrelation times, or hardware circuit taps associated with one or more of these channel properties, or some combination. In some embodiments CSI is determined based on feedback measured from known transmitted signals called pilot symbols or retransmission of known data. Here Y, the desired output, is the MCS class that provides the desired video quality. Thus, the training set collected in step 301 includes for each instance an input value for a quality metric, an input value indicating one of a plurality of scalable video coding (SVC) structures for that quality metric, and an input value of acoustic channel information and a class s of MCS such that reconstructed video features based on the class of MCS and the SVC structure is sufficiently similar for a particular purpose (based on the quality metric) to original video features.

In step 303, a model M is selected, where M includes parameters P comprising fixed parameters $P_F$ and learned parameters $P_L$ where model M produces $Y_M$ from input X and M includes transmitter model $M_T$ and receiver model $M_R$ and acoustic propagation model $M_A$. Here $Y_M$ is the model output that indicates a MCS class s that reconstructs SVC video features to the satisfaction of the quality metric (e.g., BER) given channel state information. Here a Deep learning convolutional neural network (Deep CNN) is used as the model and its weights and biases are included in the $P_L$. In addition, a simple relational model is used to output an SVC structure, given as input a quality metric $X_Q$ and channel information $X_A$. The coefficients of this model are among the learned parameters $P_L$. The propagation model $M_A$ and the receiver model are defined by the other parameters values and do not have any parameters among the learned parameters $P_L$.

In step 311, machine learning is performed using the training subset $T_T$ to determine values for $P_L$. In some embodiments, the propagated vector considered to be received at the receiver and subsequently input to the receiver model $M_R$ is not a measured vector but a simulated vector based on the transmitted vector and the acoustic propagation model $M_A$ fully determined by the acoustic channel measures $X_A$. In some embodiments, the propagated vector subsequently input to the receiver model $M_R$ is in fact a measured received vector determined during underwater experiments, included in the context information for the training set, or updates thereto, and associated with the acoustic channel measures $X_A$. In the example embodiments described in the next section, the original video structures in both the training set and the operational use are confined to representations of underwater imagery, e.g., omitting video, audio, text and drawing vectors.

In step 313, it is determined if a model M training stop condition has been reached, such as any of the stop conditions described above with respect to machine learning, or some combination. Recall that typical stop conditions include one or more of a certain number of iterations, a certain number of cycles through the training subset $T_T$ of the training set T, producing differences between $Y_M$ and Y less than some target threshold, producing successive iterations with no substantial reduction in differences between $Y_M$. If it is determined that the stop condition is not yet satisfied, control passes back to step 311 to continue with machine learning for model M.

If it is determined in step 313 that the stop condition is satisfied, then control passes to step 315 to determine whether the trained model M is validated. Any method may be used to validate the trained model M, such as differences between the model output YM and the source XS is acceptably small, as measured by maximum or average differences or a random distribution of differences. If it is determined that the model M is not yet validated, control passes back to step 301 to expand the training set T and continue with machine learning for model M.

If it is determined in step 315 that the model M is validated, then control passes to step 321. In step 321, the trained model M is installed into a communication system on submersible device (e.g., an underwater monitoring station or manned or unmanned vehicle) with an acoustic transceiver. The submersible device is then deployed into an underwater environment. The communication system on the submersible device is then operated according to a portion of the method described by steps 331 to 361.

In step 331, the communication system on the submersible device determines whether it is to operate its acoustic transceiver as a transmitter. If so, control passes to step 351, described below. If not, then the communication system operates the acoustic transceiver as a receiver and control passes to step 333.

In step 333, the communication system determines whether it is receiving a reliable message, such as one or more pilot symbols that are transmitted on occasion by other surface or submersible devices or a return of a previous message transmitted. If so, then control passes to step 341. In step 341 the properties of the received reliable message such as one or more test images or pilot symbols, is used to determine channel conditions, i.e., values of one or more acoustic channel measures $X_A$. These values are stored by the communications system as representative of temporally current channel conditions in the vicinity of the submersible device.

In addition, the receiver determines the quality metric $X_Q$ for video transmissions by other devices intended for this receiver. For example, the receiver determines that it can tolerate a large or small bit error rate (BER) because it desires low or high resolution imagery, respectively.

Based on the channel conditions and the quality metric, the receiver uses the simple relational model to determine the SVC structure appropriate for those two inputs. Then the SVC structure, the quality metric $X_Q$ and the acoustic channel conditions $X_A$ are input to the DeepCNN to determine the MCS class s to be used for transmissions of video to the receiver by other devices. Step 341 includes storing the values of SVC structure and MCS class s for later use and sending the values of SVC structure and MCS class s to one or more transmitters via a reliable message. In some embodiments, the values of $X_Q$ and $X_A$ are sent to another device, in addition to or instead of the values of SVC structure and MCS class s. Then, the other device can use the simple relational model to derive SVC and use the DeepCNN to determine MCS class s when transmitting video to the receiver.

In some embodiments, the receiver uses the reliable message received to determine the quality metric from another device that sent the reliable message. In some of these embodiments, the message also indicates the channel conditions at the other device. Alternatively, or in addition, the reliable message includes data indicating the SVC structure and MC class s to be used for transmission of video to that other device that sent the reliable message. This information is stored for later use, e.g., during step 355, described below. Control then passes to step 343.

In step 343, the training set T (training subset $T_T$ or validation subset $T_V$) is updated based on the known data and the actual received data and the derived acoustic channel measures $X_A$. In step 345 it is determined whether the model M should be retrained, e.g., after the submersible is retrieved and compared to the known data sent. If so, control passes back to step 311 and following described above. If not, control passes to step 361. In some embodiments, step 343 is omitted and control passes from step 341 to step 361.

In step 361, it is determined whether conditions to end acoustic communications are satisfied, such as when the submersible device resurfaces and is in contact with the air for resumption of radio communications. If so, the process ends. Otherwise, control passes back to step 331, described above.

If it is determined in step 333 that the communication system is NOT receiving a a reliable message, such as one or more pilot symbols, then control passes to step 335. In step 335, the receiver uses the current values of SVC and MCS, which were sent to potential transmitters in step 341, to process the data in the message just received and thus reconstruct an acceptable facsimile of the original video. The reconstructed video is then used by the receiving submersible device for whatever purpose the transmitted source video was intended, such as to initiate capture or evasion maneuvers. Control then passes to step 361 to determine whether to end acoustic communications, as described above.

If it is determined, in step 331, that the communication system operates the acoustic transceiver as a transmitter then control passes to step 351. In step 351, original video to be transmitted is obtained, e.g., from an underwater camera or environmental sampler on the submersible device or known or predetermined data such as pilot symbols used to assess acoustic channel measures $X_A$. In step 353, stored values for the acoustic channel measures $X_A$ and quality metric supplied by the device to receive the video (derived in step 341) are retrieved. In a preferred embodiment, stored values for the SVC structure and MCS class s supplied by the device to receive the video (derived in step 341) are retrieved.

In step 355, the retrieved values of SVC structure and MCS class are used to encode and transmit the video data. In embodiments in which only the value of $X_Q$ is supplied by the device to receive the video, optionally with a value for $X_A$, then the stored values for $X_Q$ an $X_A$ are used with the trained simple relational model to derive SVC and then all three values are input to the DeepCNN to derive MCS class s. Then the derived values of SVC structure and MCS class are used to encode and transmit the video data. Control then passes to step 361 to determine if end conditions are satisfied, as described above.

2.3 Advantages

The advantages of these techniques include selecting physical layer acoustic coding classes, such as MCSs, adaptively by referring to the CSI based on machine learning, e.g., a DCNN, and decoding the VC video adaptively according to users' video quality targets, and saving resources by avoiding transmitting CSI packets and redundant VC enhancement layers. Example embodiments described in the next section demonstrated a reduction in resource waste while meeting users' quality targets with higher flexibility compared to existing non-cross-layering designs.

3. EXAMPLE EMBODIMENTS

Example embodiments are described here.

Here, an embodiment called Receiver Driven Adaptive Scalable Video Transmission underwater (RD-ASVTuw) is described. In this embodiment, the SVC encoding is requested by the receiver based on target quality using a trained simple relational model and not selected to optimize acoustic transmission. Only the choice of MCS class s is trained into a neural network. Thus, in the training set, the input source data $X_S$ includes the SVC structure option based on the receiver request for quality ($X_Q$) and the Y values MCS class s from the physical transmission protocol to input to the SVC decoder for the same level of quality ($X_Q$). The model M includes as $M_T$ the transmission encoding using unknown MCS class s based on the SVC structure $X_S$ and the channel characteristics $X_A$ and the physics-based distortion of the transmitted signal at the receiver, e.g., using a Rician model for shallow water propagation over hundreds of meters in water depth about 100 m, or measured distortion during field experiments. M excludes $M_R$ and parameters $P_R$. X includes $X_A$ and $X_S$ and $X_Q$. In these embodiments $X_Q$ and $X_A$ are provided in separate reliable message communications between transmitter and receiver before transmitting video. In these embodiments, $X_Q$ is expressed as a tolerable bit error rate (BER). SVC structure $X_S=f(X_A,X_Q)$ is realized by curve fitting, instead of neural network training. Conversely, $Y=MCS=q(X_S, X_Q,X_A)$ is realized by neural network training. In the Receiver-Driven embodiments, the trained model is used at the receiver to determine the SVC structure and MS class s to us during transmission of video and the receiver sends that information in a reliable message to a device that will transmit video data through the underwater acoustic channel.

The schemes and parameters to use at the application and the physical layer are selected adaptively by considering the CSI and video quality targets with cross-layer interactions. The video quality is used at the application layer to: (i) select the appropriate SVC encoding method; and (ii) determine the tolerable Bit Error Rate (BER) (BER threshold) of received video streams. To determine the value of the BER threshold, the relationship between the physical-layer BER and the application layer video quality is constructed. Multiple Modulation and Coding Schemes (MCSs) are then available at the physical layer, providing different performances in terms of robustness against the channel dynamics and achievable data rates. The physical layer customizes the MCS according to the CSI and BER threshold by machine learning, e.g., Deep Convolutional Neural Networks (DCNN) [10]. Then the receiver feeds back the selected MCS and SVC structure to the transmitter. When in a multicast network, the transmitter will get different MCS and SVC selections from all the receivers and select the MCS with the highest robustness and the SVC with the highest video quality. Since substreams with different SVC video quality levels can be derived from one received stream, different users can decode videos according to their targets with high flexibility. The BER is estimated at the physical layer and then passed to the application layer to tune the video decoding adaptively, thus trying to meet the video quality targets.

It is expected that this strategy is the first to concern resource waste due to discarded SVC video substreams in underwater time varying channels. The proposed RD-ASVTuw includes both adaptive SVC selection and adaptive MCS selection.

3.1 Example Embodiment Structures

Figures 4A, 4B:
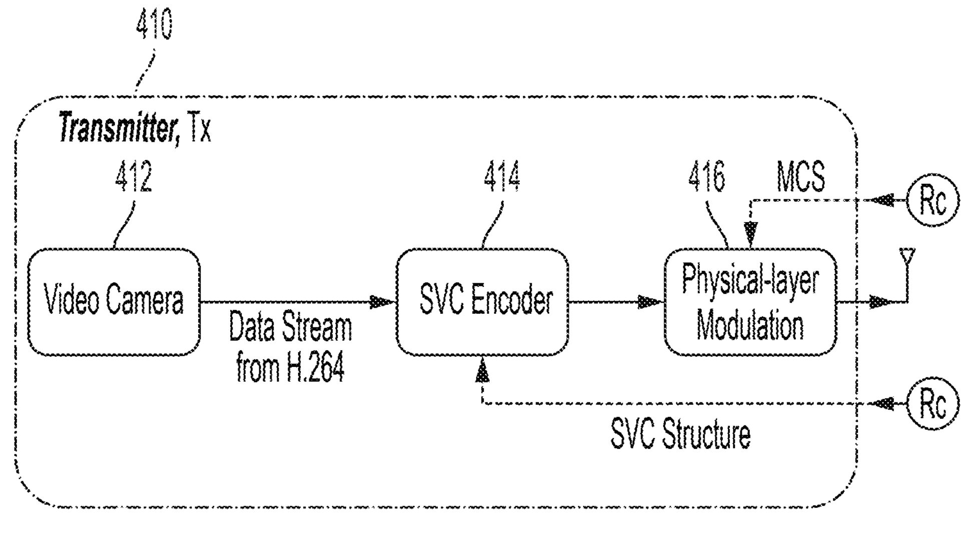
FIG. 4A and FIG. 4B are block diagrams that illustrate examples of a transmitter module and a receiver module, respectively, for performing underwater acoustic communication of video data, according to an embodiment.

FIG. 4A and FIG. 4B are block diagrams that illustrate examples of a transmitter module 410 and a receiver module 430, respectively, for performing underwater acoustic communication of video data, according to an embodiment. Typically, each underwater device includes one each of transmitter module 410 and receiver module 430. The transmitter module 410 depicted in FIG. 4A includes a source 412 of video data, such as video camera that outputs a formatted video stream, such as an H.264 video stream. That video stream is encoded for transmission at an application layer encoding module 414, such as SVC encoder, using one of several structures e.g., types and degrees of compression or feature extraction, depending on desired image quality. The coded output from the application layer encoding module 414 is modulated for transmission in a physical layer modulation module 416 using one of several physical layer protocols, characterized herein as one of several MCS classes.

The receiver module 430 depicted in FIG. 4B includes a channel estimation module 438, a physical-layer demodulation module 436, a cross layer adaptivity module 435 that implements the simple relational model and the DeepCNN model, an application layer decoder 434, such as a SVC decoder, and a video quality satisfaction module 432. The modules 436 and 438 constitute a physical layer 460; while the modules 434 and 432 constitute the application layer 440. The module 435 performs across both layers, hence its name. The channel estimation module 438 is configured to determine the channel state information (CSI) in $X_A$ and feeds that to the cross-layer adaptivity module 435. The video quality satisfaction module 432 determines the video quality context $X_Q$ to be targeted or actually achieved and fees that to the cross-layer adaptivity module 435. Based on these two inputs, the cross-layer adaptivity module 435 uses the simple relational model to determine a preferred SVC structure, and uses that preferred SVC structure and the $X_A$ and $X_Q$ contexts in the trained DeepCNN model to output the preferred MCS class s. Here the receiver 430 interacts with the transmitter 410 and feeds back the selected MCS class s and the SVC structure.

Figure 5:
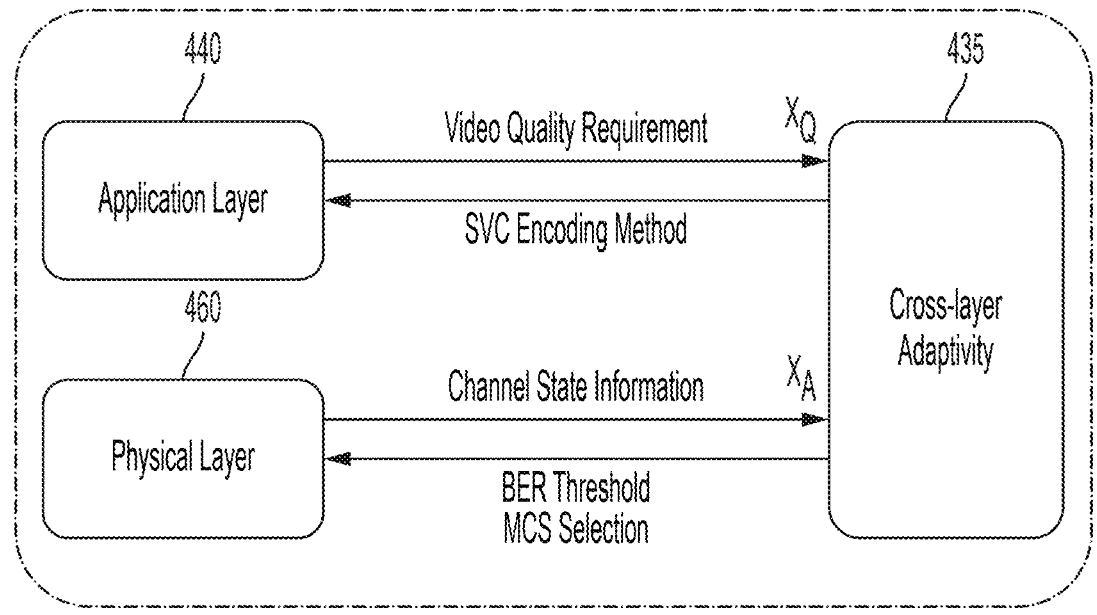
FIG. 5 is a block diagram of an example cross-layer adaptivity component used in the receiver module of FIG. 4B, according to an embodiment.

FIG. 5 is a block diagram of an example cross-layer adaptivity component used in the receiver module of FIG. 4B, according to an embodiment. This diagram illustrates the position of the cross-layer adaptivity module 435 as a go between across the application layer 440 and the physical layer 460.

RD-ASVTuw selects the MCS and the SVC video encoding method at the receiver based on the estimated CSI and the video quality targets. The estimated CSI is in the form of the channel impulse response. As shown in FIG. 5, the cross-layering design is composed of adaptive SVC selection and adaptive MCS selection. The presence of random error bits on the communication link reduces the received video quality. Through cross-layer interactions, the proposed strategy aims to ensure that the MCS selected at the physical layer is able to limit the BER under the desired threshold set by the application layer quality target. To realize this goal, DCNN is applied with the CSI and the BER threshold as inputs and the appropriate MCS as the output. The MCS used in the training set is selected to not only limit the BER under the threshold but also make the physical layer throughput as high as possible. At the same time, the encoding of the SVC layers is selected to minimize the introduced overhead by using a simple relational model in the cross-layer adaptivity to determine the SVC encoding method. The CSI is updated over time and provided to the cross-layer in order to select the best combination of the MCS and the SVC encoding method. With the SVC scalability the RD-ASVTuw can be used to accommodate the request of a single receiver (unicast) or multiple receivers with different video quality targets (multicast).

3.2 Example Embodiment Methods

To meet the video quality target while reducing the waste of resources resulting from the transmissions of unneeded redundant bits or the transmissions of enhancement layers that will be discarded at the receiver, the SVC encoding method is selected adaptively at the transmitter. To ensure the quality of the received video, a BER threshold is set by the cross-layering strategy to limit the distortion caused by random error bits.

Assume the size of an SVC video is S, which is a function of SVC structure selected. There are $N_{SVC}$ kinds of SVC encoding methods. The received video quality is qr=Q( ), which is a function of BER and SVC. The target video quality is q0, and the BER threshold is p0 below which is the desired performance. The problem of SVC selection can then be as described in Equations 1.

$$\min_{i=1}^{N_{SVC}} S(SVC_i) \text{ such that } qr = Q(p0, SVC_i),\ qr \geq q0 \tag{1}$$

where Q is any quality measure, such as peak signal to noise ratio (PSNR) or Structural Similarity (SSIM) or Mean Opinion Score (MOS).

The MCS is processed by training a DeepCNN (DCNN) composed of convolutional layers, average pooling layers, and fully connected layers. Compared with other basic machine learning (ML) models, such as decision trees and adaptive boosting ensembles, the DCNN can input the BER threshold and the entire CSI sequence and learn the characteristics of the channel state without losing information [41]. The training set is composed of Ns training samples, $$\{F^n, C^n\}_{n=1}^{Ns}$$

where $F^n$ is the feature set and $C^n$ is the class label of n-th training sample. $F^n$ contain the CSI and the BER thresholds. The class label is the MCS that achieves the highest effective data rate while controlling the BER under the threshold. In this work, the DCNN model is trained with a simulated CSI dataset and applied to the real world. Since different scenarios lead to different CSI, we simulate a rich set of possible scenarios exploring different values of SNR, multipath delay lifetime, and Doppler frequency shift based on the Rician fading channel model, which has been proven to be a good match for the short-range shallow-water channel, i.e., with a depth less than 100 m [42, 43]. After the DCNN is trained on the simulated CSI dataset, the receiver-feedback CSI from the at-sea experiments together with the BER thresholds set by the adaptive SVC selection are input to the trained DCNN and the trained DCNN outputs the selected MCS.

Assume the effective data rate is $\eta_f$, which is a function of MCS. There are $N_{MCS}$ classes of MCS. The received BER is pe=PE( ) which is a function of CSI and MCS. We can cast the problem of MCS selection as Equation 2.

$$\min_{j=1}^{N_{MCS}} \eta_f(MCS_j) \text{ such that } pe = PE(CSI, MCS_j),\ pe < p0 \tag{2}$$

The SVC generates layered bitstreams that can be modulated separately. Therefore, the BER threshold for each layer can be different according to the cross-layering interactions. This is called uneven error protection (UEP). When constructing the relationship between the BER and the video quality, we find that when applying low BER (e.g., $10^{-5}$) at the base layer and high BER at the enhancement layers (e.g., $10^{-4}$), the received video quality is still high. Therefore, the RD-ASVTuw can select the MCS for each SVC layer according to the BER threshold per layer: The MCS with high robustness but a low data rate is selected for the base layer (low BER threshold); The MCS with low robustness but a high data rate is selected for the enhancement layers (high BER threshold). As a result, the effective data rate is improved for UEP compared with even error protection (EEP).

FIG. 6A is a flow chart expressed in example pseudocode for a method used at a video underwater transmitter, according to an embodiment. FIG. 6B is a flow chart expressed in example pseudocode for a method used at a video underwater receiver, according to an embodiment. Algorithms 1 and 2, listed in FIG. 6A and FIG. 6B, respectively, show the procedure of the RD-ASVTuw at the transmitter (unicast case) and the receiver. The whole video transmission is divided into several chunks. The chunk size is decided by the transmission time and decoding time so that transmitting new chunks and decoding old chunks can be processed in parallel. First, the transmitter transmits the pilot sequence (composed of 64 symbols with high auto-correlation) to the receiver. Then the receiver estimates the CSI. If the SNR reported in the CSI is too low (e.g., lower than a threshold obtained in preparing the training set), the transmitter will be notified to increase the transmit power and send the pilot sequence once more. Then the receiver will update the CSI estimation. If the in-demand power exceeds the maximum allowed power level, the MCS with higher robustness will be introduced, e.g., CDMA with a long spread code length. Then the training model should be updated. With the required video quality, the receiver determines the BER threshold for each SVC layer for EEP or UEP. With the estimated CSI as well as the BER threshold, the proper MCS for each SVC layer is predicted based on the trained DCNN model. Then the receiver feeds back the indexes of the selected MCS and SVC encoding scheme to the transmitter, and the transmitter transmits the MCS information, the pilot sequence, and the video streams to the receiver. The receiver decodes the video streams' headers to learn the SVC structure and reconstruct the SVC video according to the required video quality. Since the estimated CSI keeps being updated at the receiver at the start of each transmission loop, the MCSs are always selected according to the most recent information. The video quality targets are updated only when a chunk finishes being transmitted and received.

Thanks to the flexible layer structure of SVC video streams, only one video stream can be transmitted to meet the quality targets of multiple users. Therefore, each user/receiver can select the SVC layers to decode according to its own needs. To extend the RD-ASVTuw to multicast, each user transmits the indexes of MCS and SVC schemes to the transmitter in each loop of video transmission. If one of the receivers feeds back a low SNR, the transmitter will increase the transmit power. Different from the unicast scenario, this time the transmitter needs to meet the targets and BER thresholds of multiple users. The transmitter gets a list of the selected SVC indexes and a list of the MCS indexes. Then it will select the SVC with the highest video quality and the MCS with the highest robustness. At each receiver side, the processing is the same as the unicast.

3.3 Example Embodiments Performance

FIG. 7 is a map that illustrates a experimental setup, according to an embodiment. To validate various embodiments, we conducted a total of 12 full days of experimentation over a time window spanning from August 2020 to June 2021, using the NATO Science and Technology Organization (STO) Centre for Maritime Research and Experimentation (CMRE) Littoral Ocean Observatory Network (LOON) testbed [44]. In the experiments, a multicast scenario was considered with one transmitter and three receivers at different locations, as shown in FIG. 7. The collected acoustic data of received video streams and channel states were then used in simulations (MATLAB) to analyze the quality and data rate in detail and to compare with the existing non-cross-layering designs. Different video quality metrics are investigated using Luminance peak signal to noise ratio (Y-PSNR), SSIM, and MOS. The Y-PSNR metric measures the luminance-associated distortion based on the overall Mean Square Error (MSE) of video streams. The SSIM measures the fidelity of the video signals and the similarity of the local area luminance, local area contrast, and local patch structure compared with the original video stream. To correlate better with the human-perceived video quality, MOS is applied as a subjective metric. The MOS has a scale from 0 to 100 and is calculated based on the existing dataset [45]. Since the different metrics focus on different video characters, the variation tendency of different metrics won't be totally the same, which is the reason why all three metrics were considered when building relationships between the physical and application layers.

Three physical layer modulation schemes (MCS classes) are considered: CDMA, OFDM, and OSDM. K is the number of symbols in a symbol vector. In one frame of N vectors, there is one pilot vector and N−1 data vectors. L is the length of zero Guard Intervals (GI) or Cyclic Prefix (CP) frame header data. The frame length $L_f$=KN+L, and the effective data rate is given by Equation 3.

$$\eta_f = \frac{MK(N-1)R_{ch}}{(KN+L)T_s} \tag{3}$$

where M is the modulation order. M=2 for Quadrature Phase Shift Keying (QPSK). $T_s=1/f_s$ is the symbol period of the system.

Figure 7A:
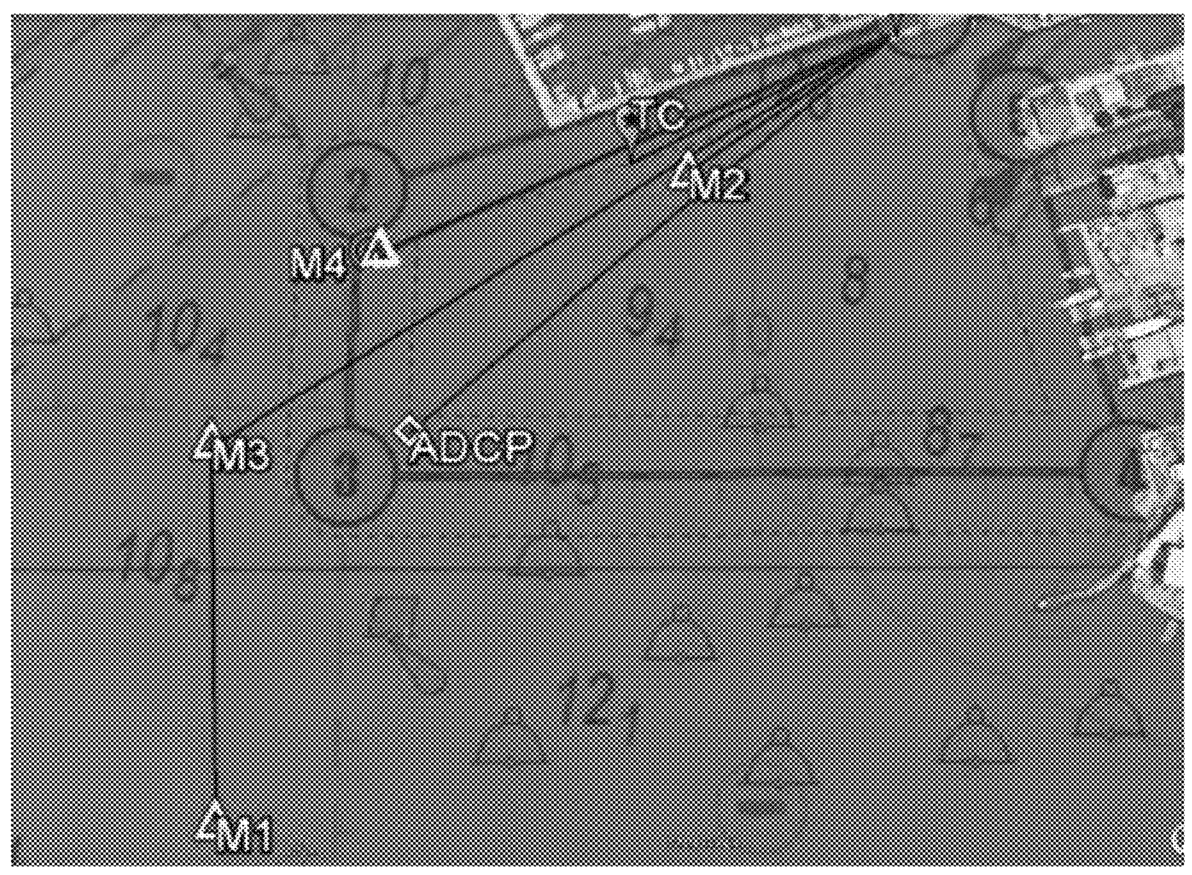
FIG. 7A is a map that illustrates a experimental setup, according to an embodiment.

FIG. 7B through FIG. 7D are tables that list properties of experiments associated with FIG. 7A, according to an embodiment. Table 1 in FIG. 7B lists the setting of parameters for experiments, where DAC is the Digital-to-Analog Converter and ADC is the Analog-to-Digital Converter. Since the frequency band is limited in to a range from 8 kHz to 14 kHz, the effective data rate is also limited. There is one speaker at the transmitter and one hydrophone at each receiver. Table 2 in FIG. 7C describes the parameters of different MCSs used in four different cases described below. Note that the CDMA transmits signals with a spread code length of 4, so the effective data rate of CDMA is ¼ times other schemes' effective data rates. At the application layer, the SVC is encoded by Joint Scalable Video Model (JSVM) software, and decoded by OpenSVC Decoder [46].

In what follows, the CMRE LOON testbed is presented first, used for at sea experiments and data collection. The procedure of the RD-ASVTuw strategy is then illustrated. The results show that the RD-ASVTuw strategy can select the video transmission scheme while meeting users' quality requirements effectively in a time-varying fading underwater acoustic channel.

Four tripods are fitted with EvoLogics S2C 18/34 acoustic modems [49] with arbitrary waveform transmission and recording capability. The transmission capability makes use of the Lubell LL916 system [50]. While for the reception, the ocean sonics icListen smart hydrophones [51] are used1. All four tripods are able to transmit arbitrary waveforms while only M1, M2 and M3 are able to record data using the icListen smart hydrophone, so a multicast transmission is considered where M4 is used as the transmitter and M1, M2, M3 are the receivers. The underwater depth in the area is around 10 m with transducers deployed about 1 m above the seafloor.

The received video quality versus BER considering both SVC and Advanced Video Coding (AVC) with EEP, provided the relationship between the physical-layer BER and the application-layer video quality. The SVC video stream is generated with one base layer, one quality enhancement layer, and one spatial enhancement layer, while the AVC video only has one layer without any enhancement layers [52]. Due to the limited bandwidth in underwater acoustic channels (UACs), all the layers are set with a slow frame rate of 1:875 frames per second (fps). Parameters for the SVC and AVC design are listed in Table 3 presented in FIG. 7D. The Quantization Parameter (QP) regulates how much spatial detail is saved. The Spatial Resolution (SR) refers to the number of pixels in an image. To compare the SVC and AVC fairly, the parameters of AVC are the same as the highest-quality SVC enhancement layer, so that the encoded video quality of SVC and AVC are equal.

Figure 7F:
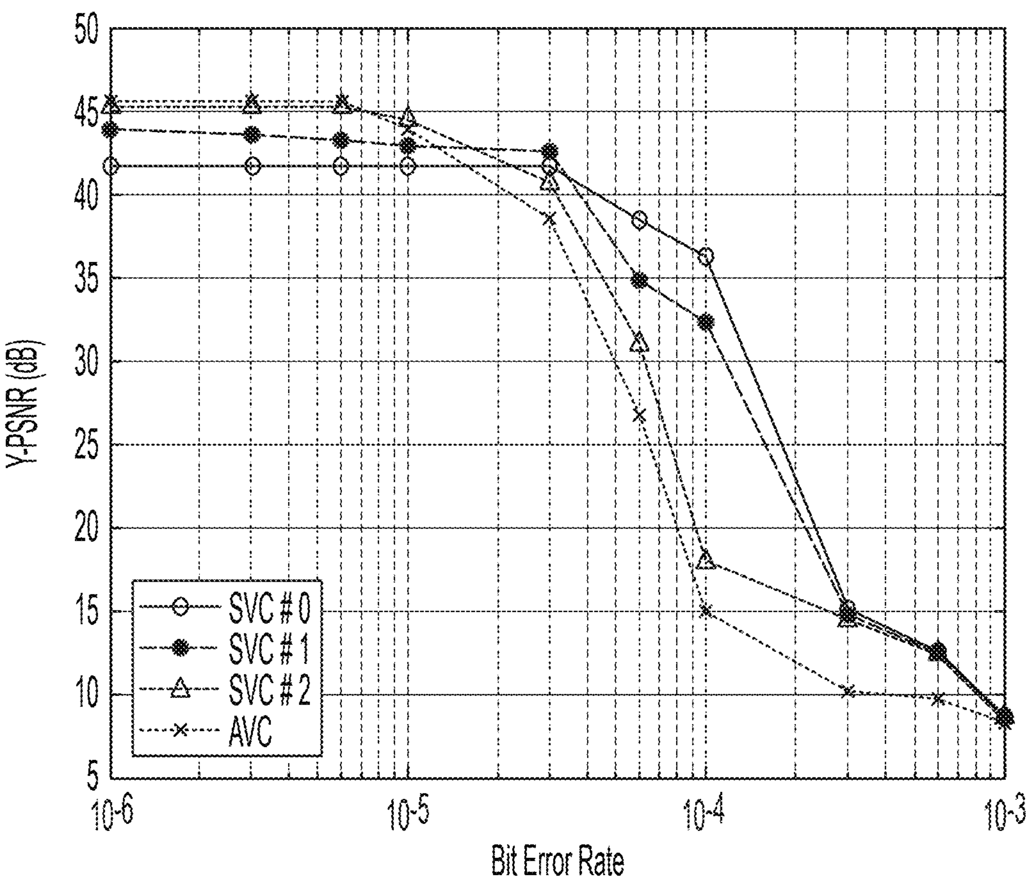
FIG. 7F and FIG. 7G are plots of the video quality as a function of the bit error rate for various application layer modules, according to an embodiment.
Figure 7G:
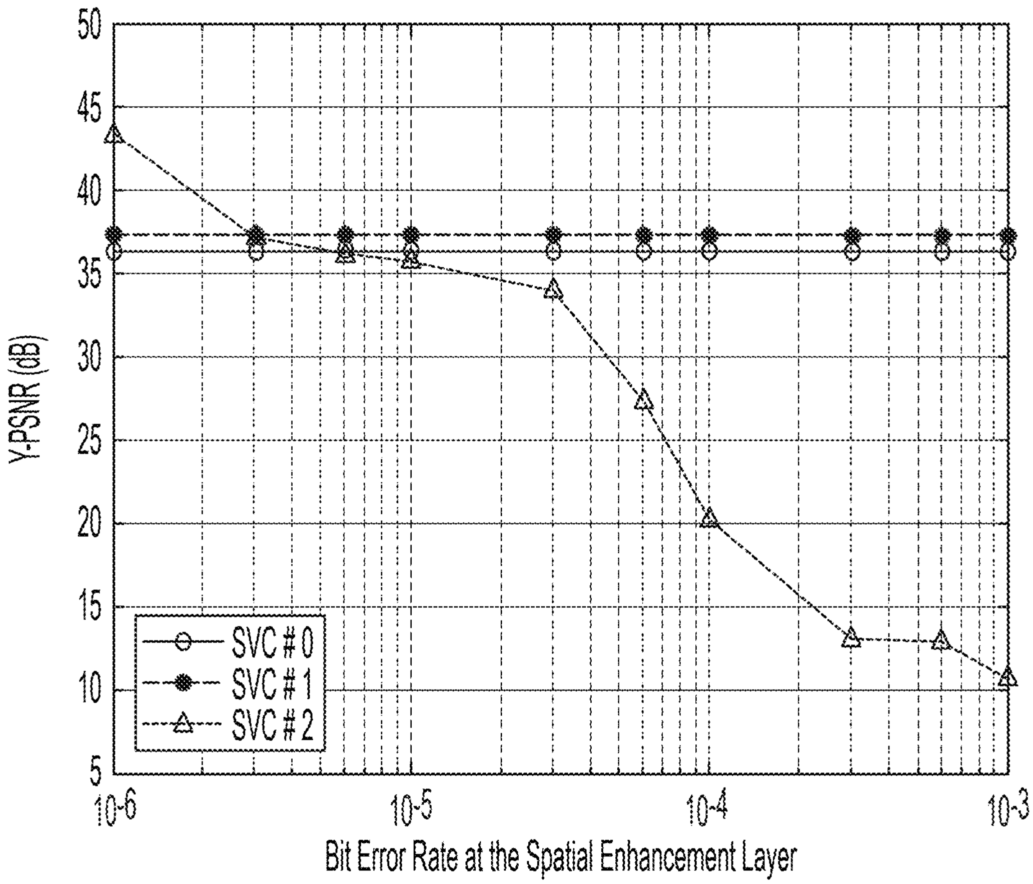

Video quality was assessed using PSNR, computed as in Equation 4).

$$PSNR = 10\log\left(\frac{255^2}{MSE}\right) \tag{4}$$

where MSE is mean square error. FIG. 7F and FIG. 7G are plots of the video quality as a function of the bit error rate for various application layer modules, according to an embodiment. SVC #0 stands for SVC only with the base layer. The SVC #1 stands for SVC with the base layer and one quality enhancement layer. The SVC #2 stands for SVC with the base layer, one quality enhancement layer, and one spatial enhancement layer.

During the experiment, it was observed that when the BER is lower than $10^{-5}$, the SVC video with more layers improves the video quality. However, when the BER is high, the SVC video with more layers has a lower quality than that with fewer layers. That is a reason to choose low-quality decompression (application layer coding) in the bad channel and high quality decompression in the good channel. It was also observed that the variation tendency of different metrics versus increased BER is similar but not totally the same. When the BER is between $6\times10^{-5}$ and $10^{-4}$, the SVC #2 (one base layer and two enhancement layers) has a higher PSNR but a lower SSIM and a similar MOS than AVC. When the BER is between $10^{-5}$ and $3\times10^{-5}$, the video with only one base layer has the highest Y-PSNR, but the video with quality enhancement layer has the highest SSIM and MOS. Therefore, to fulfill users' target quality, both objective and subjective metrics can be taken into consideration. The spatial enhancement layer has a larger size and introduces more errors when the BER is high, which is the reason why the quality of SVC #2 (one base layer, one quality enhancement layer, and one spatial enhancement layer) drops rapidly with increasing BER. The performance of AVC is observed to drop even more rapidly than those of SVC #2 when the BER is lower than $3\times10^{-5}$ since the AVC lacks error-resilient coding and error concealment. Moreover, the SVC realizes flexibility in encoding videos at the receiver, which is the reason why we utilize SVC in the RD-ASVTuw embodiment.

Y-PSNR performance with UEP when the BER at the base layer ($BER_B$) is $10^{-4}$ and the BER at the quality enhancement layer ($BER_Q$) is $10^{-5}$. The video quality of SVC #2 decreases dramatically even when BER at the spatial enhancement layer (BERS) is higher than $10^{-5}$. Moreover, when decoding with SVC #0 and #1, the data in the spatial enhancement layer are also referred to by the base layer and the quality enhancement layer. Therefore, the errors in the spatial enhancement layer also influence the performance of SVC #0 and #1. Where the $BER_B=BER_Q=10^{-5}$, the quality of SVC #2 does not drop much when $BER_S<3\times10^{-5}$. Where the BER is $10^{-5}$ at the base layer and is $10^{-4}$ at the quality enhancement layer, the performance of SVC #1 (one base layer and one quality enhancement layer) and SVC #2 is worse than for both $BER_B$ and $BER_Q$ low, but better than for high $BER_B$ and it is able to tolerate more error bits than both low at the quality enhancement layer.

Before the video transmissions, the DCNN is trained with a 5-fold cross-validation and achieves an accuracy of 0.91. The input dataset includes the CSI dataset and the corresponding proper MCSs. The CSI dataset is composed of channel impulse responses with the SNR of 15, 16, . . . , 25 decibels (dB), the multipath delay lifetime of 0.42, 0.84, . . . , 6.30 milliseconds (ms), and Doppler frequency shift of 4, 6, . . . , 14 Hz, which are prepared by simulations.

Figure 7H:
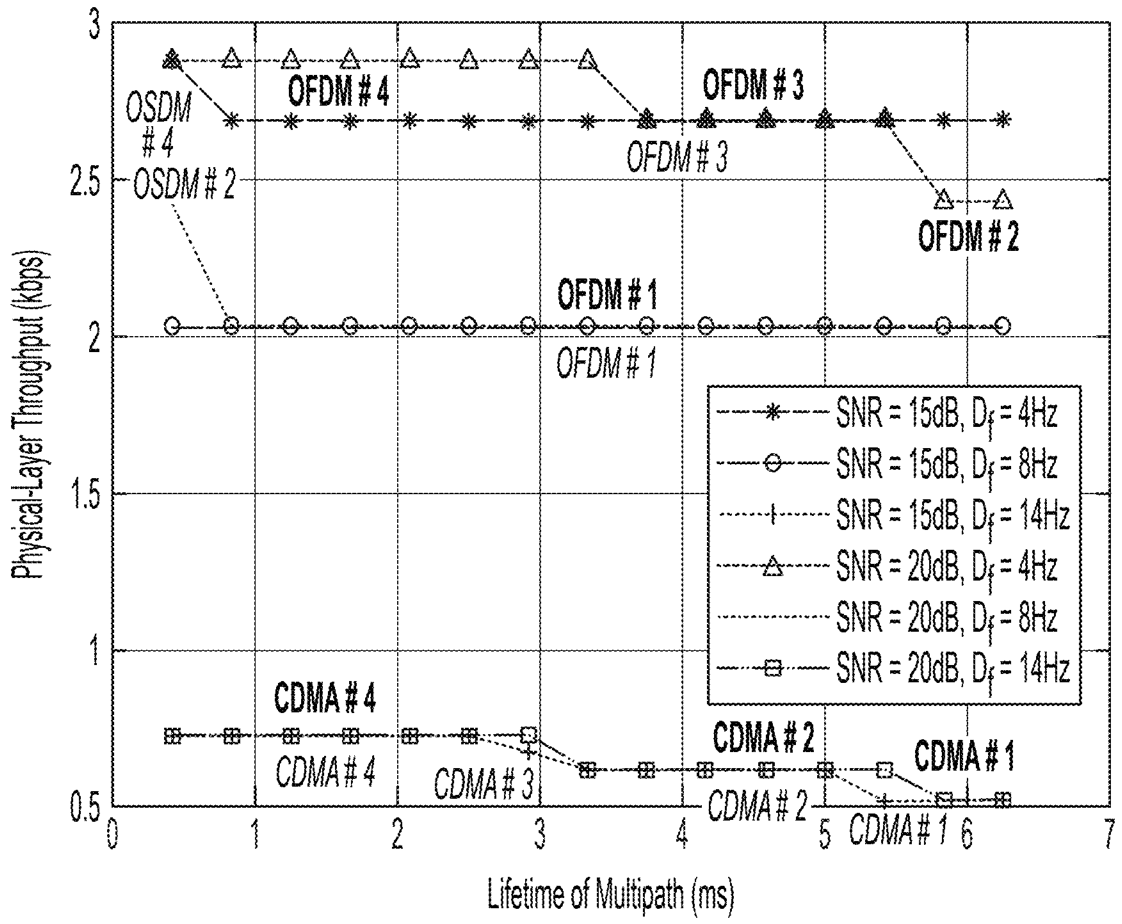
FIG. 7H through FIG. 7J are plots that illustrate examples of average physical-layer throughput of the proposed RD-ASVTuw with different channels and BER thresholds, according to an embodiment.
Figure 7I:
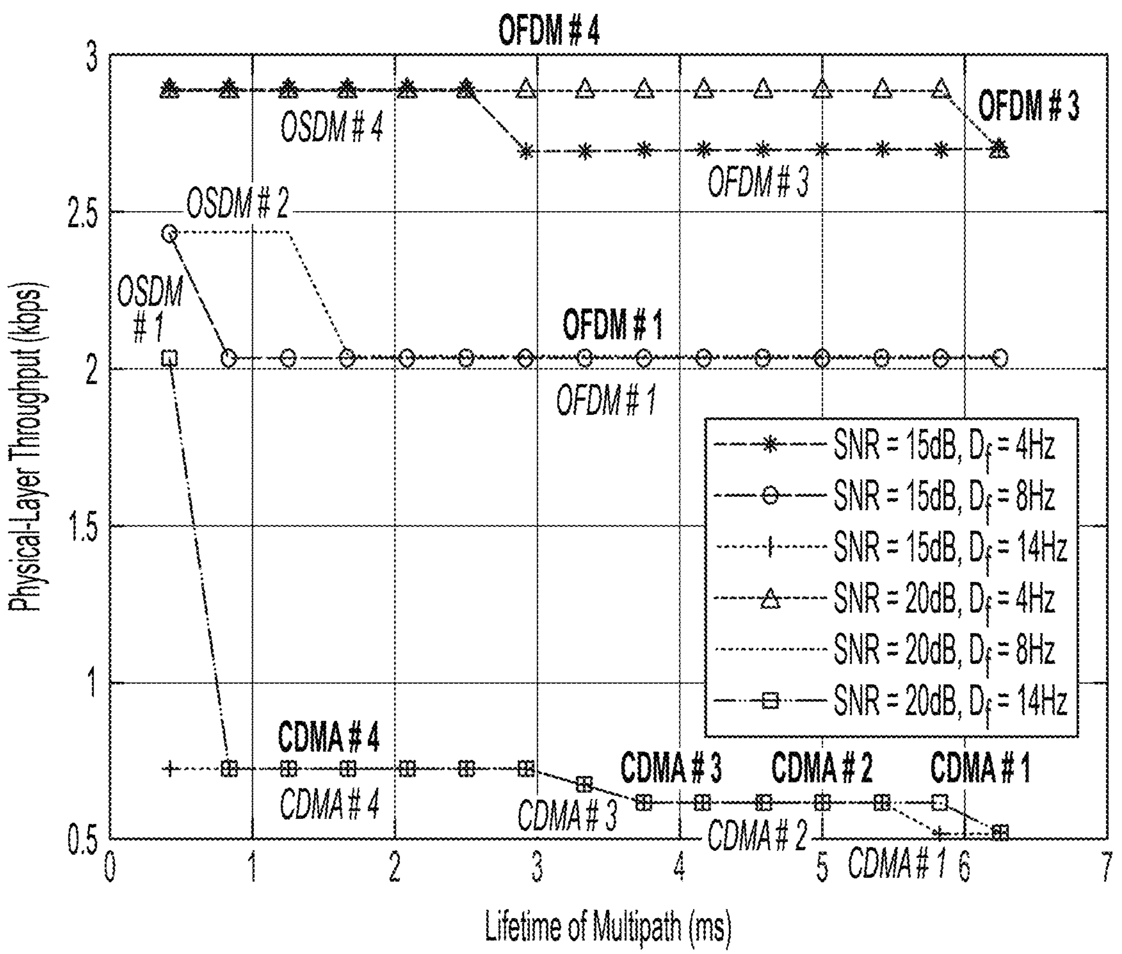
Figure 7J:
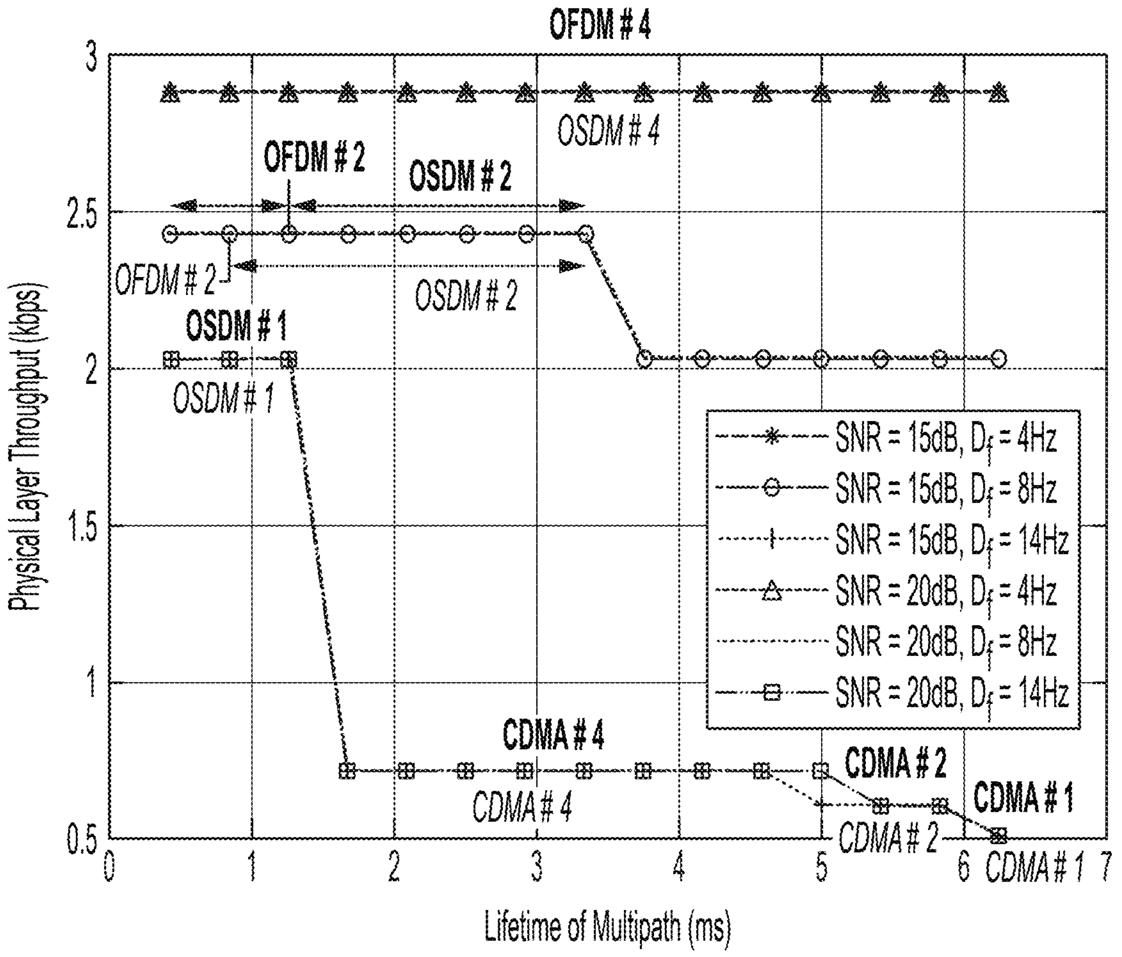

FIG. 7H through FIG. 7J are plots that illustrate examples of average physical-layer throughput of the proposed RD-ASVTuw with different channels and BER thresholds, according to an embodiment. The parameters for different MCSs are shown in Table 2. To allocate the resource adaptively and effciently, the RD-ASVTuw uses multiple MCSs at the physical layer and selects the MCSs according to the CSI.

Figures 8A, 8B, 8C:
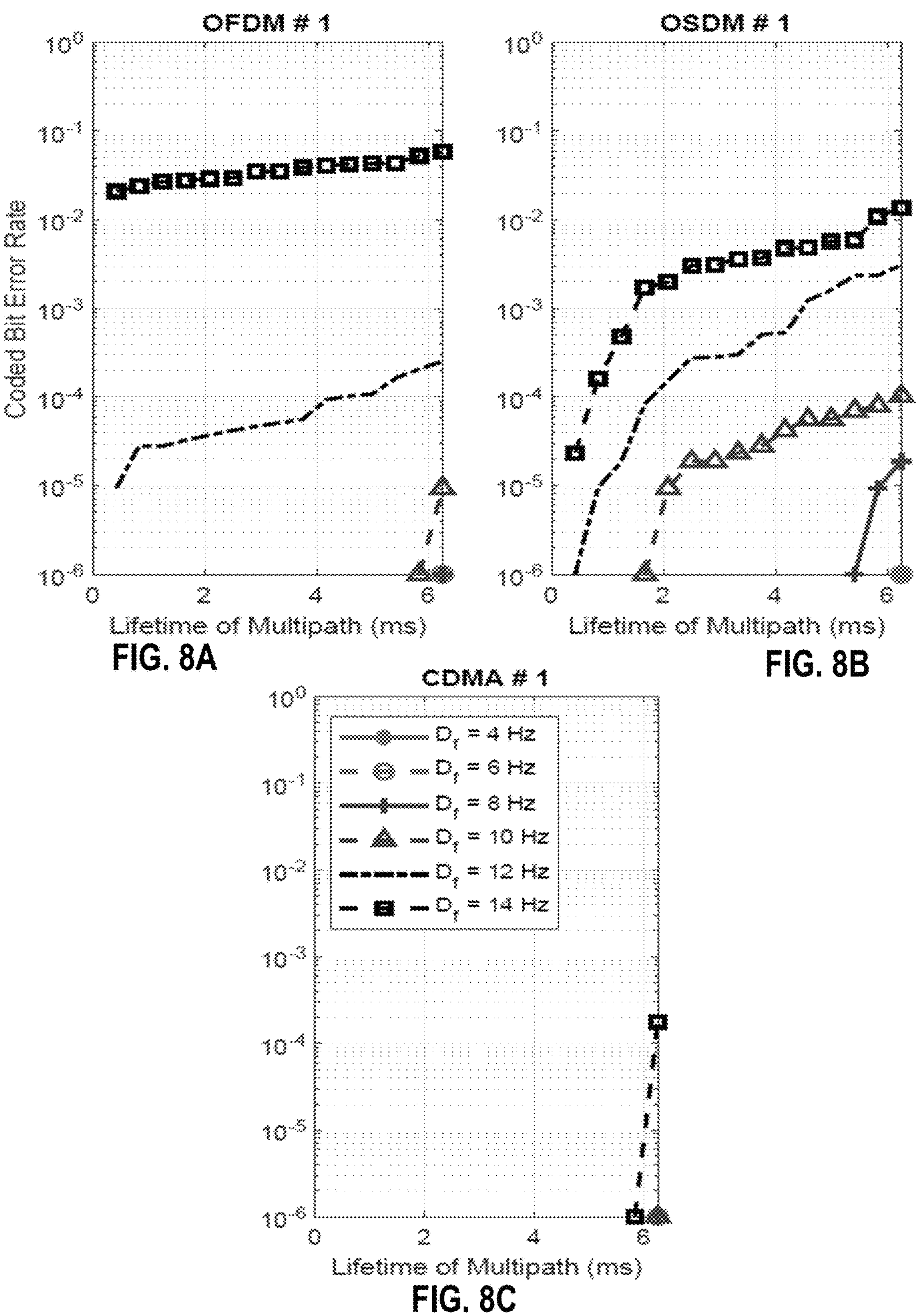
FIG. 8A through FIG. 8C are plots that illustrate relationship to be modeled between bit error rate (BER) of received signals with different channel state information (CSI) for different MCS classes (OFDM, OSDM, CDMA), respectively, according to an experimental embodiment.
Figures 9A, 9B, 9C:
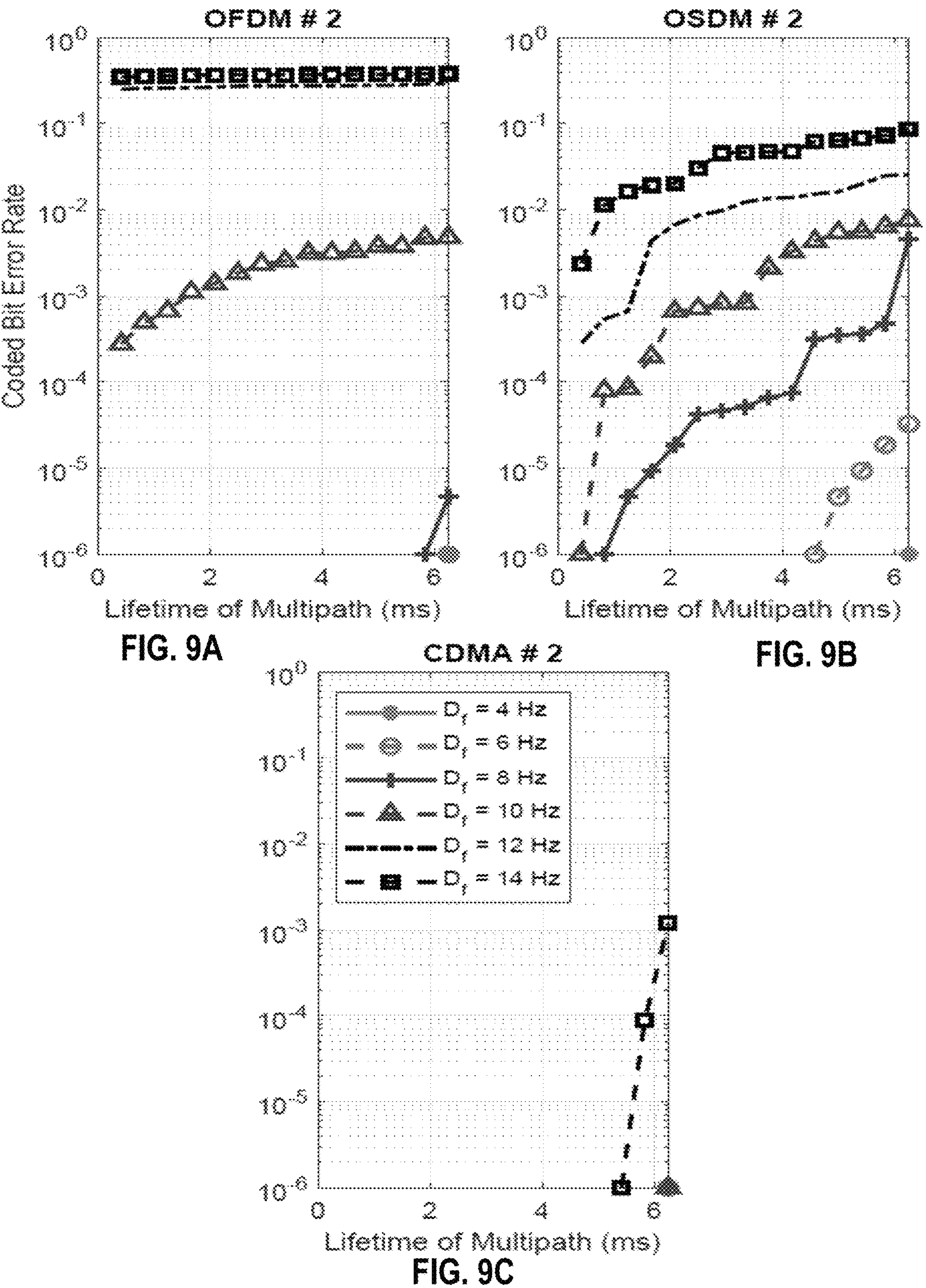
Figures 10A, 10B, 10C:
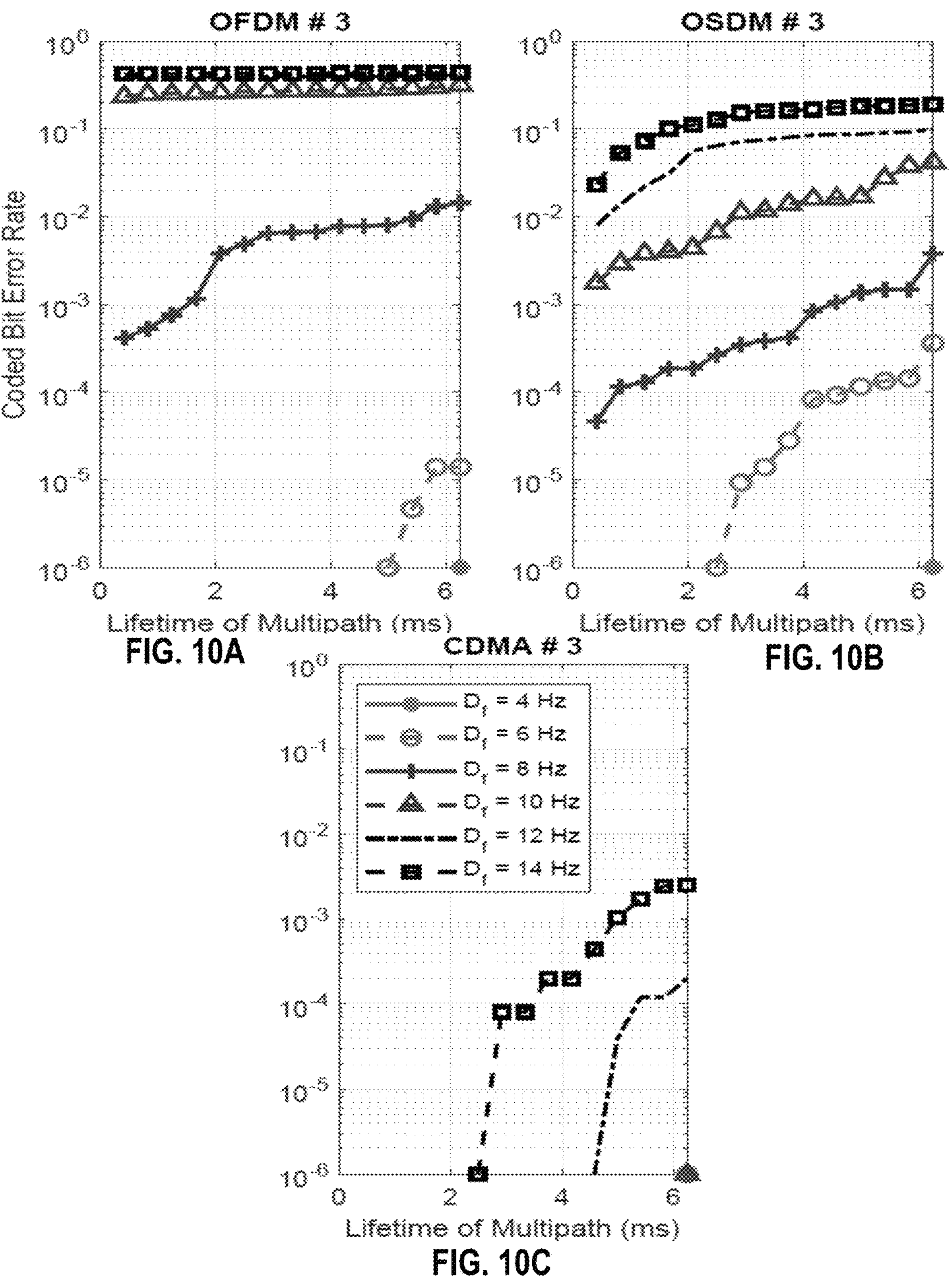
Figures 11A, 11B, 11C:
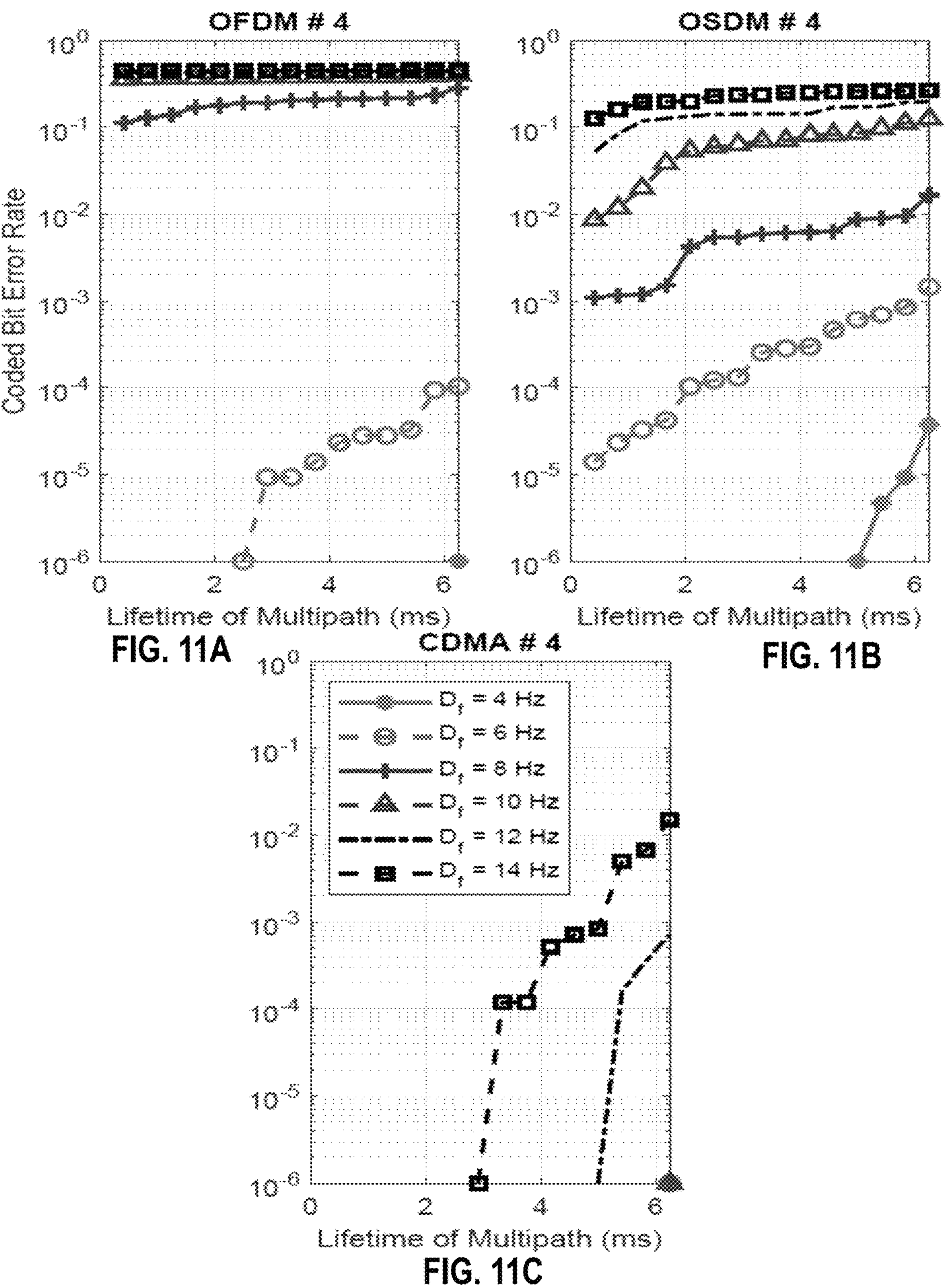

FIG. 8A through FIG. 8C are plots that illustrate relationship to be modeled between bit error rate (BER) of received signals with different channel state information (CSI) for different MCS classes (OFDM, OSDM, CDMA), respectively, according to an experimental embodiment. FIG. 9A through FIG. 11C are plots similar to FIG. 8A through FIG. 8C, for three different experimental runs, according to an experimental embodiment. The BER is plotted versus different channel states with different MCSs when the SNR is 20 dB, which is a part of the training dataset. When the SNR is lower than 15 dB, an MCS with a lower effective data rate (e.g., CDMA #1) is always preferred. Hence, the SNR threshold is set as 15 dB. The channel impulse response is a vector of 64 complex numbers. There are 200 CSI samples for each combination of SNR, multipath delay lifetime, and Doppler shift. The BER thresholds include three values: $10^{-3}$, $10^{-4}$, and $10^{-5}$. In the at-sea experiments, the estimated CSI from the real world is treated as the input to predict the optimal MCS.

The physical-layer throughput of the proposed RD-ASVTuw is equal to $\eta_p\times(1-BER)$, which determines the maximum achievable video transmission bitrate. When the channel is good, the RD-ASVTuw selects physical-layer MCS with a higher data rate (e.g., OFDM #4). When the channel is bad, the RD-ASVTuw selects MCS with more robustness but also with a lower data rate (e.g., CDMA #1). Therefore, the resource is allocated adaptively to improve the system's robustness and achieve an efficient data rate.

Figures 12A, 12B:
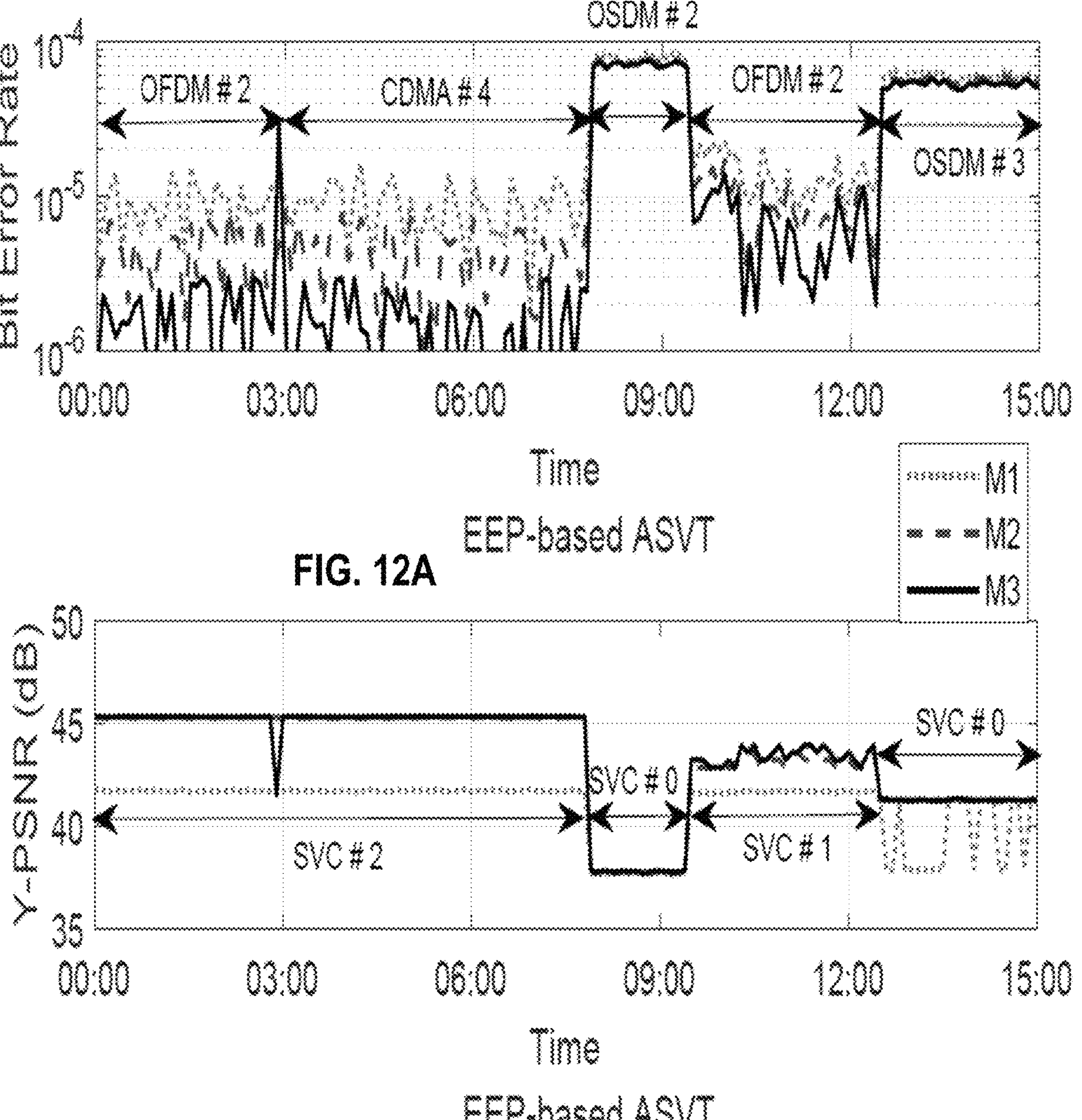
FIG. 12A and FIG. 12B are plots that illustrate examples of quality performance of video underwater transmission in the presence of a changing acoustic channel for three users, according to an embodiment.

FIG. 12A and FIG. 12B are plots that illustrate examples of quality performance of video underwater transmission in the presence of a changing acoustic channel for three users, according to an embodiment. FIG. 12C through FIG. 12E are plots that illustrate examples of quality performance when SVC structure does not depend on changing acoustic channel for the same three users for comparison. These depict the comparison between the received video quality performance of adaptive SVC selection in the RD-ASVTuw (FIG. 12A and FIG. 12B) and that of the non-cross-layering design (the SVC encoding method is fixed) in FIG. 12C through FIG. 12E. The video quality requirements of three users are listed in Table 4 in FIG. 7E. FIG. 12A shows the varying BER when using EEP-based RD-ASVTuw from 00:00 to 15:00 on June 10, 2021. The transmission schemes are selected by adaptive MCS selection based on DCNN. FIG. 12B shows the received video quality at the receivers. At 00:00, the required Y-PSNR is 40 dB at M1 and is 45 dB at M2 and M3. Therefore, M1 selects SVC #0 and OSDM #3 with BER threshold of $10^{-4}$, while M2 and M3 select SVC #2 and OFDM #2 with BER threshold of $10^{-5}$, respectively. Then the transmitter gets feedback of a list of selected SVCs: {SVC #0, SVC #2, SVC #2}; and a list of selected MCSs: {OSDM #3, OFDM #2, OFDM #2}. So, the transmitter selects the SVC structure with the highest video quality, i.e., SVC #2, and the MCS with the highest robustness, i.e., OFDM #2. After receiving the video streams at M1, only the base layer (SVC #0) is decoded. At M2 and M3, the SVC #2 is selected as the video decoding method. In each loop of video transmissions, the CSI is updated to decide if the MCS needs to be changed. At 02:50, the channel state at M3 varies dramatically and the CDMA #4 is selected. There is a BER peak at 02:50, since the MCS is not changed accordingly in time. After 03:00, the BER performance goes back to the previous status, because a more robust MCS (CDMA #4) is applied. At 08:00, the users change the video quality requirement requesting for a Y-PSNR higher than 35 dB. To meet this request, it is sufficient to encode the video using only the SVC #0 and OSDM #2.

When using UEP-based RD-ASVTuw, better results can be achieved. When using EEP, as in FIG. 12B, the SVC #1 with OFDM #2 is selected at 09:30, so the effective data is 2.43 kilobits per second (kbps) according to Table 2 in FIG. 7C. However, with UEP, the BER threshold is $10^{-5}$ for base layer packets, and is $10^{-4}$ for quality enhancement layer packets. Hence, base layer packets are transmitted with OFDM #2 and quality enhancement layer packets with OSDM #3, which also meets the users' targets. The size of the base layer packets is 9693 bytes in total and the size of the quality enhancement layer packets is 17947 bytes in total, so the effective data rate is 2.60 kbps.

With a non-cross-layering design where the SVC/AVC structure is fixed, the physical layer cannot determine the BER threshold according to the required video quality, so a secure BER threshold would always be selected, e.g., $10^{-5}$, and the UEP would not be applied. For the non-cross-layering design with SVC #2 shown in FIG. 12C, the SVC decoding method is according to the required video quality. From 08:00 to 09:30, the video quality requirements of the three users are all Y-PSNR above 35 dB, so only the SVC base layer is decoded, while the enhancement layers are discarded, which is a waste of resources. For the non-cross-layering design with SVC #1 shown in FIG. 12D, the received video quality of M2 cannot meet the required video quality with a PSNR of 45 dB from 00:00 to 08:00, because the achievable video quality of SVC #1 is limited. For the non-cross-layering design with AVC shown in FIG. 12E, the receivers cannot select the decoding method according to their requirements, which is less flexible than SVC.

Figure 13A:
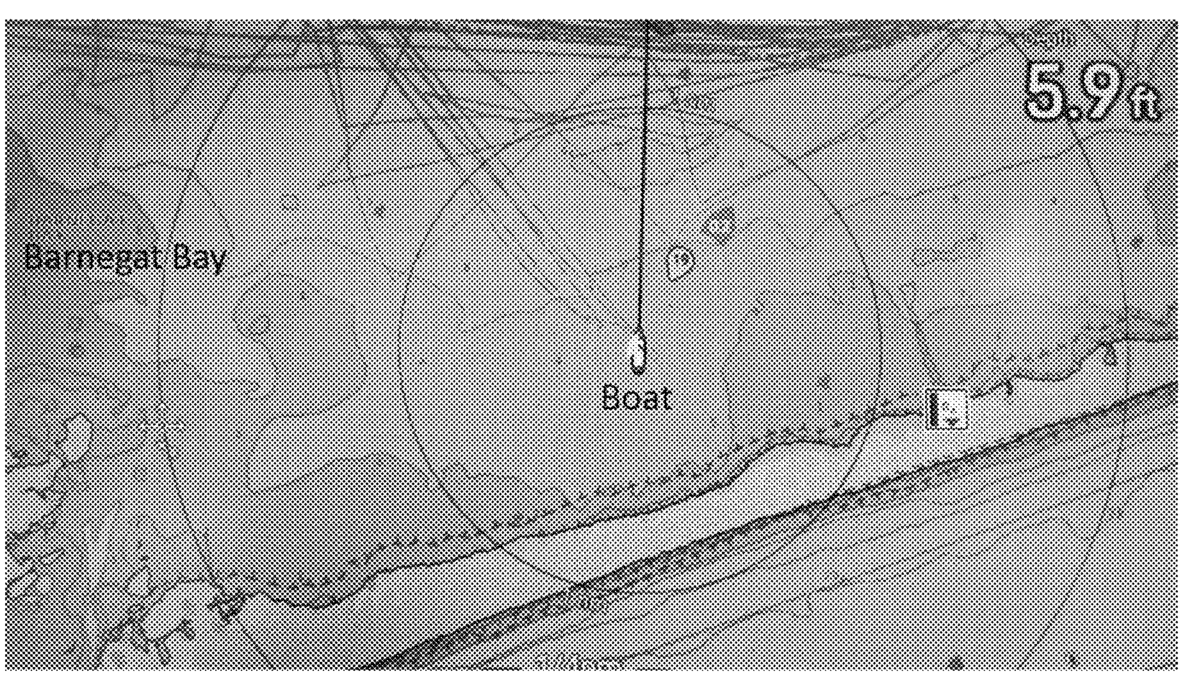
FIG. 13A is a map that illustrates a experimental setup, according to another embodiment.
Figure 13B:
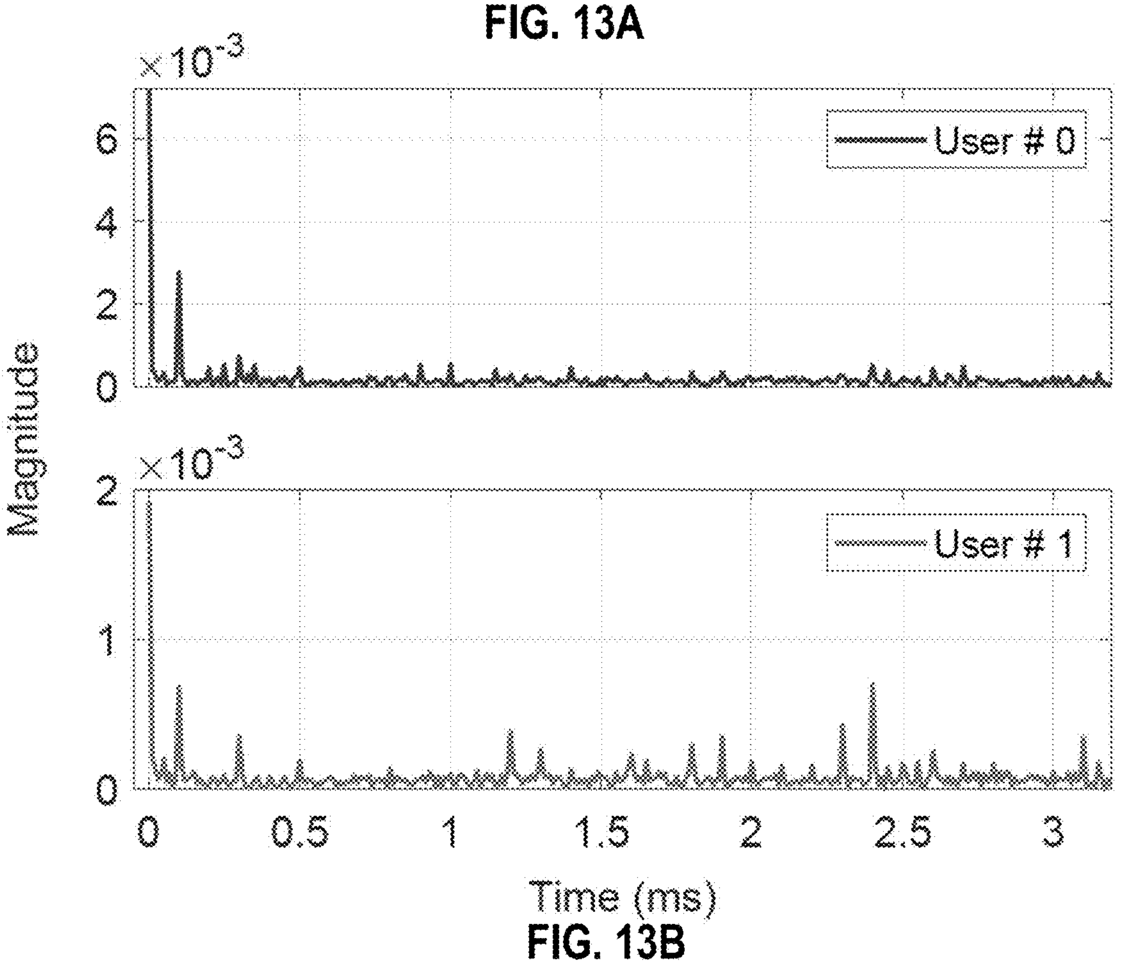
FIG. 13B is a stacked plot that illustrates examples of Channel impulse response at 16:37 on May 22 for two users, according to this experimental embodiment.

FIG. 13A is a map that illustrates a experimental setup, according to another embodiment. Channels were also collected from at-sea experiments at Barnegat Bay NJ, mapped in FIG. 13, on May 22, 2023, using the Universal Software Radio Peripheral (USRP) X-300 Software-Defined Radio (SDR) boards, which are designed by the National Instrument (NI) [53]. One USRP board is fixed at the stern and is equipped with one transducer at a depth of 0.6 m. Another USRP board is fixed at the bow and equipped with two hydrophones for two receivers/users, at depths of 0.4 m (User #0) and 0.8 m (User #1). Each side is equipped with one laptop for signal transmitting and processing. The distance between the transmitter and the receivers is approximately 10 m. PA2010PC hydrophone power amplifier (powerAmp) [55] is deployed at the transmitter to amplify the transmit power, and two VP2000 voltage preamplifiers (preAmps) [56] are deployed at the receivers to improve the SNR. FIG. 13B is a stacked plot that illustrates examples of Channel impulse response at 16:37 on May 22 for two users, according to this experimental embodiment. The magnitude at User #1 is lower than for User #0.

FIG. 13C and FIG. 13D are tables that list properties of experiments associated with FIG. 13A, according to an embodiment. The experimental parameter setting is detailed in Table 5 listed in FIG. 13C. The required video quality is shown in Table 6 listed in FIG. 13D.

Figure 14:
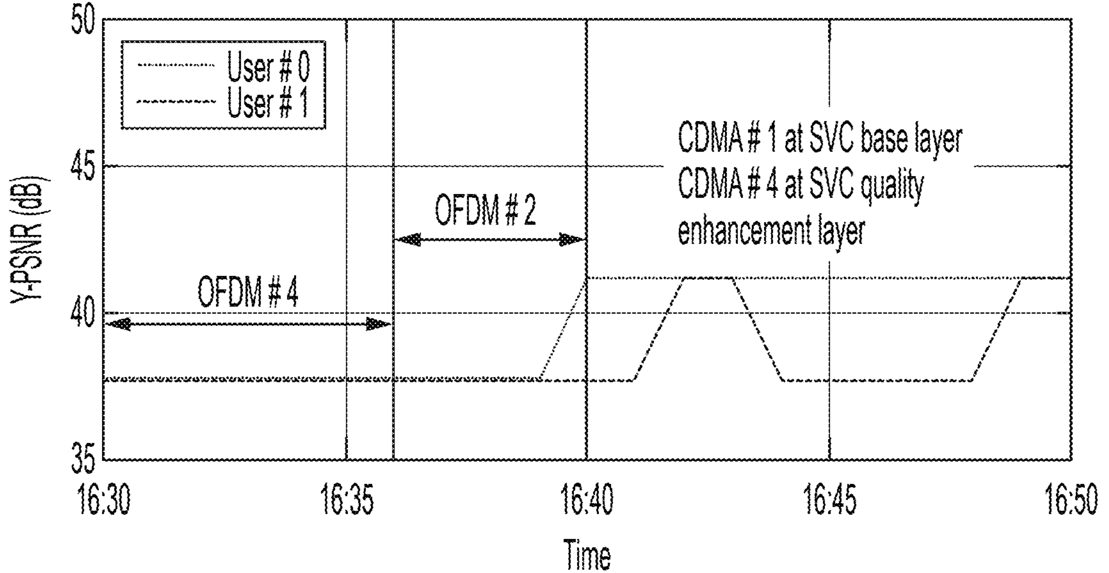
FIG. 14 is a plot that illustrates examples of differing quality performance for the two users, according to this experimental embodiment.

FIG. 14 is a plot that illustrates examples of differing quality performance for the two users, according to this experimental embodiment. At 16:30, the target Y-PSNR is 35 dB at both users, so SVC #0 and OFDM #4 are selected. At 16:36, User #0 keeps OFDM #4 while User #1 selects OFDM #2, so the transmitter selects OFDM #2 for higher robustness. At 16:40, the target Y-PSNR changes to 40 dB at User #1, so User #1 selects SVC #1 and UEP, where the base layer is transmitted by CDMA #1 and the quality enhancement layer is transmitted by CDMA #4. User #0 selects SVC #0 and OFDM #1. Consequently, the transmitter encodes video with SVC #1 and transmits with UEP as User #1 selected.

3.4 Example Embodiment Advantages

The advantages of the RD-ASVTuw include selecting MCSs adaptively with EEP/UEP by referring to the CSI based on machine learning, e.g., a DCNN, decoding the SVC video adaptively according to users' video quality targets, and saving resources by avoiding transmitting CSI packets and redundant SVC enhancement layers. The proposed RD-ASVTuw was validated in a half-duplex acoustic multicast network with at-sea experiments using the CMRE LOON testbed and USRP boards. The results showed that the proposed RD-ASVTuw can reduce resource waste and meet users' requirements with higher flexibility compared to existing non-cross-layering designs.

4. COMPUTATIONAL HARDWARE OVERVIEW

Figure 15:
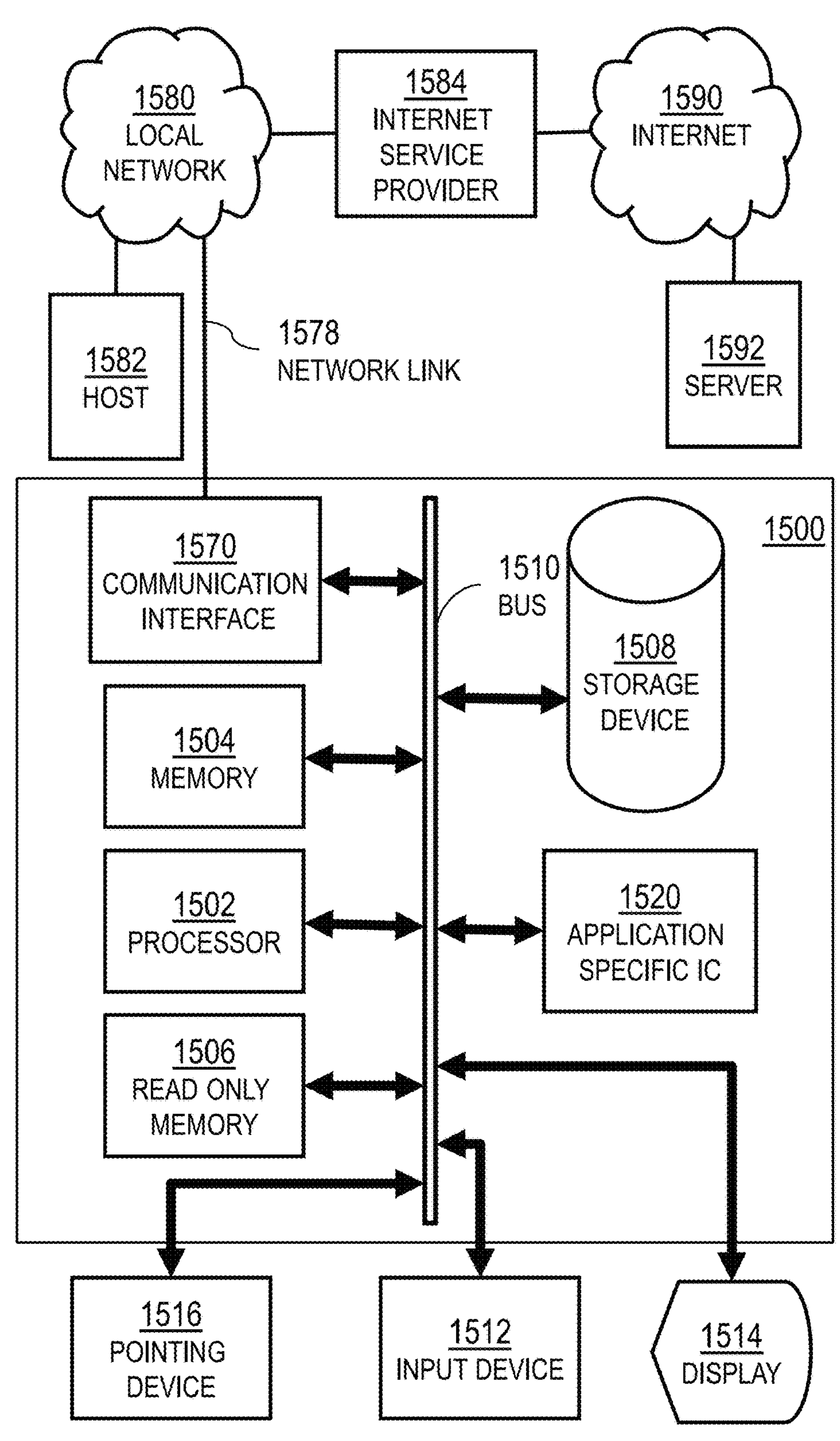
FIG. 15 is a block diagram that illustrates a computer system upon which an embodiment of the invention may be implemented.

FIG. 15 is a block diagram that illustrates a computer system 1500 upon which an embodiment of the invention may be implemented. Computer system 1500 includes a communication mechanism such as a bus 1510 for passing information between other internal and external components of the computer system 1500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1500, or a portion thereof, constitutes a means for performing one or more steps of one or more methods described herein.

A sequence of binary digits constitutes digital data that is used to represent a number or code for a character. A bus 1510 includes many parallel conductors of information so that information is transferred quickly among devices coupled to the bus 1510. One or more processors 1502 for processing information are coupled with the bus 1510. A processor 1502 performs a set of operations on information. The set of operations include bringing information in from the bus 1510 and placing information on the bus 1510. The set of operations also typically include comparing two or more units of information, shifting positions of units of information, and combining two or more units of information, such as by addition or multiplication. A sequence of operations to be executed by the processor 1502 constitutes computer instructions.

Computer system 1500 also includes a memory 1504 coupled to bus 1510. The memory 1504, such as a random access memory (RAM) or other dynamic storage device, stores information including computer instructions. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of computer instructions. The computer system 1500 also includes a read only memory (ROM) 1506 or other static storage device coupled to the bus 1510 for storing static information, including instructions, that is not changed by the computer system 1500. Also coupled to bus 1510 is a non-volatile (persistent) storage device 1508, such as a magnetic disk or optical disk, for storing information, including instructions, that persists even when the computer system 1500 is turned off or otherwise loses power.

Information, including instructions, is provided to the bus 1510 for use by the processor from an external input device 1512, such as a keyboard containing alphanumeric keys operated by a human user, or a sensor. A sensor detects conditions in its vicinity and transforms those detections into signals compatible with the signals used to represent information in computer system 1500. Other external devices coupled to bus 1510, used primarily for interacting with humans, include a display device 1514, such as a cathode ray tube (CRT) or a liquid crystal display (LCD), for presenting images, and a pointing device 1516, such as a mouse or a trackball or cursor direction keys, for controlling a position of a small cursor image presented on the display 1514 and issuing commands associated with graphical elements presented on the display 1514.

In the illustrated embodiment, special purpose hardware, such as an application specific integrated circuit (IC) 1520, is coupled to bus 1510. The special purpose hardware is configured to perform operations not performed by processor 1502 quickly enough for special purposes. Examples of application specific ICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus 1510. Communication interface 1570 provides a two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communications interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1570 sends and receives electrical, acoustic or electromagnetic signals, including infrared and optical signals, that carry information streams, such as digital data.

The term computer-readable medium is used herein to refer to any medium that participates in providing information to processor 1502, including instructions for execution. Such a medium may take many forms, including, but not limited to, non-volatile media, volatile media and transmission media. Non-volatile media include, for example, optical or magnetic disks, such as storage device 1508. Volatile media include, for example, dynamic memory 1504. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1502, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1502, except for carrier waves and other signals.

Logic encoded in one or more tangible media includes one or both of processor instructions on a computer-readable storage media and special purpose hardware, such as ASIC 1520.

Network link 1578 typically provides information communication through one or more networks to other devices that use or process the information. For example, network link 1578 may provide a connection through local network 1580 to a host computer 1582 or to equipment 1584 operated by an Internet Service Provider (ISP). ISP equipment 1584 in turn provides data communication services through the public, world-wide packet-switching communication network of networks now commonly referred to as the Internet 1590. A computer called a server 1592 connected to the Internet provides a service in response to information received over the Internet. For example, server 1592 provides information representing video data for presentation at display 1514.

The invention is related to the use of computer system 1500 for implementing the techniques described herein. According to one embodiment of the invention, those techniques are performed by computer system 1500 in response to processor 1502 executing one or more sequences of one or more instructions contained in memory 1504. Such instructions, also called software and program code, may be read into memory 1504 from another computer-readable medium such as storage device 1508. Execution of the sequences of instructions contained in memory 1504 causes processor 1502 to perform the method steps described herein. In alternative embodiments, hardware, such as application specific integrated circuit 1520, may be used in place of or in combination with software to implement the invention. Thus, embodiments of the invention are not limited to any specific combination of hardware and software.

The signals transmitted over network link 1578 and other networks through communications interface 1570, carry information to and from computer system 1500. Computer system 1500 can send and receive information, including program code, through the networks 1580, 1590 among others, through network link 1578 and communications interface 1570. In an example using the Internet 1590, a server 1592 transmits program code for a particular application, requested by a message sent from computer 1500, through Internet 1590, ISP equipment 1584, local network 1580 and communications interface 1570. The received code may be executed by processor 1502 as it is received, or may be stored in storage device 1508 or other non-volatile storage for later execution, or both. In this manner, computer system 1500 may obtain application program code in the form of a signal on a carrier wave.

Various forms of computer readable media may be involved in carrying one or more sequence of instructions or data or both to processor 1502 for execution. For example, instructions and data may initially be carried on a magnetic disk of a remote computer such as host 1582. The remote computer loads the instructions and data into its dynamic memory and sends the instructions and data over a telephone line using a modem. A modem local to the computer system 1500 receives the instructions and data on a telephone line and uses an infra-red transmitter to convert the instructions and data to a signal on an infra-red a carrier wave serving as the network link 1578. An infrared detector serving as communications interface 1570 receives the instructions and data carried in the infrared signal and places information representing the instructions and data onto bus 1510. Bus 1510 carries the information to memory 1504 from which processor 1502 retrieves and executes the instructions using some of the data sent with the instructions. The instructions and data received in memory 1504 may optionally be stored on storage device 1508, either before or after execution by the processor 1502.

Figure 16:
FIG. 16 illustrates a chip set upon which an embodiment of the invention may be implemented.
Figure 16:
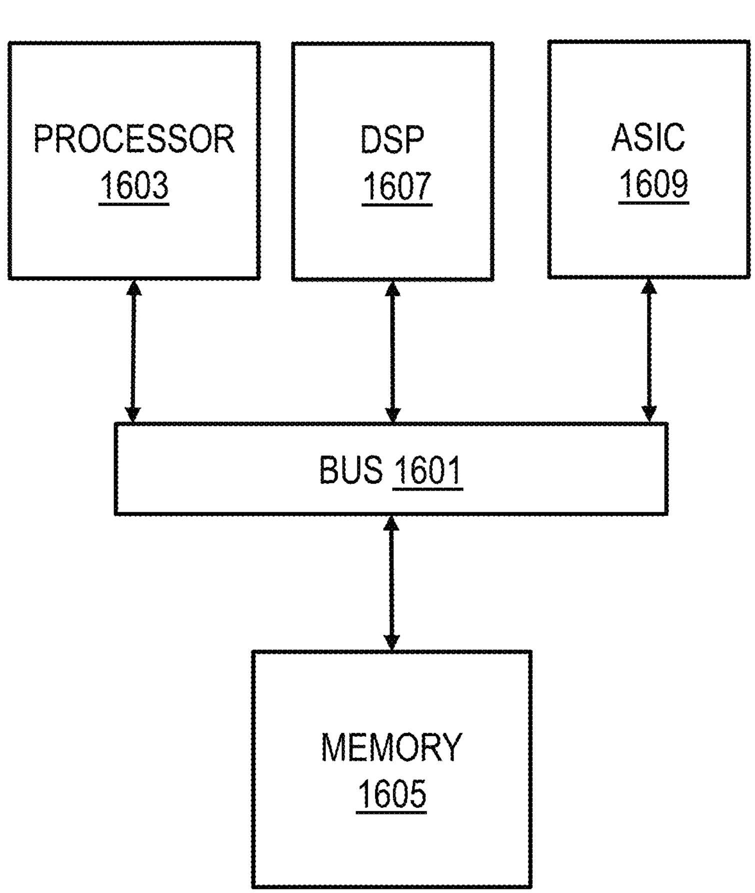

FIG. 16 illustrates a chip set 1600 upon which an embodiment of the invention may be implemented. Chip set 1600 is programmed to perform one or more steps of a method described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1600, or a portion thereof, constitutes a means for performing one or more steps of a method described herein.

In one embodiment, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1605 also stores the data associated with or generated by the execution of one or more steps of the methods described herein.

5. ALTERNATIVES, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

6. REFERENCES

All the references listed here are hereby incorporated by reference as if fully set forth herein except for terminology inconsistent with that used herein.

1. Z. Qi, R. Petroccia, D. Pompili, ASVTuw: Adaptive scalable video transmission in underwater acoustic multicast networks, in: Proceedings of the International Conference on Underwater Networks & Systems, 2022, pp. 1-8.
2. M. Ali, D. N. Jayakody, T. Perera, A. Sharma, K. Srinivasan, Krikidis, Underwater communications: Recent advances, in: Conference: International Conference on Emerging Technologies of Information and Communications (ETIC), 2019, pp. 1-10.
3. M. Soomro, S. N. Azar, O. Gurbuz, A. Onat, Work-in-progress: Networked control of autonomous underwater vehicles with acoustic and radio frequency hybrid communication, in: IEEE Real-Time Systems Symposium (RTSS), 2017, pp. 366-368.
4. H. Kaushal, G. Kaddoum, Underwater optical wireless communication, in: IEEE Access, volume 4, 2016, pp. 1518-1547.
5. Z. Qi, X. Zhao, D. Pompili, Range-extending optical transceiver structure for underwater vehicles and robotics, in: Proceedings of the 14th International Conference on Underwater Networks & Systems (WUWNet), 2019, pp. 1-8.

6. Z. Qi, X. Zhao, D. Pompili, Polarized OFDM-based pulse position modulation for high-speed wireless optical underwater communications, IEEE Transactions on Communications (2023) 1-1. doi: 10.1109/TCOMM.2023.3315313.
7. A. Y. Rodionov, S. Y. Kulik, F. S. Dubrovin, P. P. Unru, Experimental estimation of the ranging accuracy using underwater acoustic modems in the frequency band of 12 kHz, in: The 27th Saint Petersburg International Conference on Integrated Navigation Systems (ICINS), 2020, pp. 1-3.
8. D. Pompili, T. Melodia, I. F. Akyildiz, Three-dimensional and two-dimensional deployment analysis for underwater acoustic sensor networks, in: Ad Hoc Networks, volume 7, 2009, pp. 778-790.
9. H. Schwarz, D. Marpe, T. Wiegand, Overview of the scalable video coding extension of the H.264/AVC standard, in: IEEE Transactions on circuits and systems for video technology, volume 17, IEEE, 2007, pp. 1103-1120.
10. D. Arora, M. Garg, M. Gupta, Diving deep in deep convolutional neural network, in: The 2nd International Conference on Advances in Computing, Communication Control and Network-ing (ICACCCN), 2020, pp. 749-751.
11. D. B. Kilfoyle, A. B. Baggeroer, The state of the art in underwater acoustic telemetry, in: IEEE Journal of Oceanic Engineering, volume 25, 2000, pp. 4-27.
12. Z. Qi, D. Pompili, UW-CTSM: Circular time shift modulation for underwater acoustic communications, in: 17th Wireless On-Demand Network Systems and Services Conference (WONS), 2022, pp. 1-8.
13. Z. Qi, D. Pompili, Circular time shift modulation for robust underwater acoustic communications in doubly spread channels, in: Computer Communications, volume 207, 2023, pp. 77-85. doi: https://doi.org/10.1016/j.comcom.2023.05.009.
14. Y.-T. Hsieh, Z. Qi, D. Pompili, Full-duplex underwater acoustic communications via self-interference cancellation in space, in: Journal of Communications and Networks, 2023, pp. 167-181. doi: 10.23919/JCN.2022.000052.
15. Y.-T. Hsieh, Z. Qi, D. Pompili, ML-based joint Doppler tracking and compensation in underwater acoustic communications, in: Proceedings of the International Conference on Underwater Networks & Systems, 2022, pp. 1-8. doi: 10.1145/3567600.3568139.
16. K. Anjum, Z. Qi, D. Pompili, Deep joint source-channel coding for underwater image transmission, in: Proceedings of the International Conference on Underwater Networks & Systems, 2022, pp. 1-8.
17. M. Rahmati, V. Sadhu, D. Pompili, ECO-UW IoT: Eco-friendly reliable and persistent data transmission in underwater internet of things, in: Proceedings of International Conference on Sensing, Communication, and Networking (SECON), IEEE, 2019, pp. 1-9.
18. V. Sadhu, Z. Li, Z. Qi, D. Pompili, High-resolution data acquisition and joint source-channel coding in underwater IoT, in: IEEE Internet of Things Journal, 2023, pp. 1-11. doi: 10.1109/JIOT.2023.3239580.
19. K. Pelekanakis, R. Petroccia, Y. Fountzoulas, D. Green, S. Fioravanti, J. Alves, S. Blouin, S. Pecknold, A simulation study for long-range underwater acoustic networks in the high north, in: IEEE Journal of Oceanic Engineering, 2019, pp. 1-15.
20. R. Petroccia, P. Cassarà, K. Pelekanakis, Optimizing Adaptive Communications in Underwater Acoustic Networks, in: Proceedings of the MTS/IEEE OCEANS, 2019, pp. 1-7.
21. R. Petroccia, G. Zappa, T. Furfaro, J. Alves, L. D'Amaro, Development of a software-defined and cognitive communications architecture at CMRE, in: Proceedings of the MTS/IEEE OCEANS, 2018, pp. 1-10.
22. F. Campagnaro, R. Francescon, D. Tronchin, M. Zorzi, On the feasibility of video streaming through underwater acoustic links, in: 2018 Fourth Underwater Communications and Networking Conference (UComms), 2018, pp. 1-5.
23. M. Rahmati, D. Pompili, UW-SVC: Scalable video coding transmission for in-network underwater imagery analysis, in: IEEE 16th International Conference on Mobile Ad Hoc and Sensor Systems (MASS), 2019, pp. 380-388.
24. M. Rahmati, Z. Qi, D. Pompili, Underwater adaptive video transmissions using MIMO-based software-defined acoustic modems, in: IEEE Transactions on Multimedia, 2021, pp. 1-13.
25. D. Pompili, T. Melodia, I. F. Akyildiz, A CDMA-based medium access control for underwater acoustic sensor networks, in: IEEE Transactions on Wireless Communications, volume 8, 2009, pp. 1899-1909.
26. M. Rahmati, R. Petroccia, D. Pompili, In-network collaboration for CDMA-based reliable underwater acoustic communications, in: IEEE Journal of Oceanic Engineering, volume 44, 2019, pp. 881-894.
27. M. Rahmati, D. Pompili, R. Petroccia, Collaborative hybrid ARQ for CDMA-based reliable underwater acoustic communications, in: Fourth Underwater Communications and Networking Conference (UComms), 2018, pp. 1-5.
28. Y.-y. Wu, Y.-h. Zhou, F. Tong, Y.-g. Chen, Implementation and evaluation of the time reversal OFDM underwater acoustic speech communication system, in: OCEANS 2016-Shanghai, 2016, pp. 1-4.
29. A. A. Kadhim, W. Abdulwahab, Scalable video transmission using OFDM schemes over wireless channels, in: International Conference on Future Communication Networks, 2012, pp. 63-68.
30. J. Ribas, D. Sura, M. Stojanovic, Underwater wireless video transmission for supervisory control and inspection using acoustic ofdm, in: OCEANS 2010 MTS/IEEE SEATTLE, 2010, pp. 1-9.
31. A. Mahmood, M. Chitre, Detecting OSDM signals in sparse channels and snapping shrimp noise, in: The 4th Underwater Communications and Networking Conference (UComms), 2018, pp. 1-5.
32. T. Ebihara, K. Mizutani, Underwater acoustic communication with an orthogonal signal division multiplexing scheme in doubly spread channels, in: IEEE Journal of Oceanic Engineering, volume 39, 2014, pp. 47-58.
33. Z. Qi, D. Pompili, Spatial modulation-based orthogonal signal division multiplexing for underwater ACOMMS, in: Underwater Communications and Networking (UComms), 2022, pp. 1-5.
34. Z. Qi, Z. Li, D. Pompili, Orthogonal signal division multiple access for multiuser underwater acoustic networks, in: IEEE International Conference on Mobile Ad-Hoc and Smart Systems (MASS), 2023, pp. 1-7.
35. Y. Ji, F. Chen, L. Liu, MCS selection for performance improvement in downlink TD-LTE system, in: The 2nd International Conference on Business Computing and Global Informatization, 2012, pp. 687-690.

36. M. Li, C.-H. Lee, Design and analysis of CQI feedback reduction mechanism for adaptive multicast IPTV in wireless cellular networks, in: IEEE Transactions on Vehicular Technology, volume 69, 2020, pp. 2008-2020.
37. K. Pelekanakis, L. Cazzanti, G. Zappa, J. Alves, Decision tree-based adaptive modulation for underwater acoustic communications, in: IEEE 3rd Underwater Communications and Network-ing Conference (UComms), 2016, pp. 1-5.
38. M. Elwekeil, S. Jiang, T. Wang, S. Zhang, Deep convolutional neural networks for link adaptations in MIMO-OFDM wireless systems, in: IEEE Wireless Communications Letters, volume 8, 2019, pp. 665-668.
39. P. Casari, B. Tomasi, K. Pelekanakis, M. Chitre, M. Zorzi, Performance evaluation of SNR prediction schemes in acoustic communication systems using variable-rate modulation, in: Proceedings of the Underwater Acoustic Measurement Conference, Kos island, Greece, 2011.
40. Y. Guo, Y. Chen, Y.-K. Wang, H. Li, M. Hannuksela, M. Gabbouj, Error resilient coding and error concealment in scalable video coding, in: IEEE Transactions on Circuits and Systems for Video Technology, volume 19, 2009, pp. 781-795.
41. I. Goodfellow, Y. Bengio, A. Courville, Deep Learning, MIT Press, 2016.
42. A. Radosevic, J. G. Proakis, M. Stojanovic, Statistical characterization and capacity of shallow water acoustic channels, in: OCEANS 2009-EUROPE, 2009, pp. 1-8.
43. H. Kulhandjian, T. Melodia, Modeling underwater acoustic channels in short-range shallow water environments, in: Proceedings of the International Conference on Underwater Net-works & Systems, 2014, pp. 1-5.
44. J. Alves, J. Potter, P. Guerrini, G. Zappa, K. LePage, The LOON in 2014: Test bed Description, in: Underwater Communications and Networking (UComms), 2014, pp. 1-4.
45. Laboratory for image and video engineering—the university of Texas at Austin, 2013. World Wide Web edu subdomain live of subdomain ece of domain utexas folder research file Quality.
46. M. R. Mederic Blestel, Open SVC decoder: A flexible SVC library, in: Proceedings of the inter-national conference on Multimedia, 2010, pp. 1463-1466.
47. R. Petroccia, J. Śliwka, A. Grati, V. Grandi, P. Guerrini, A. Munafò, M. Stipanov, J. Alves, R. Been, Deployment of a persistent underwater acoustic sensor network: The CommsNet17 experience, in: Proceedings of MTS/IEEE OCEANS, 2018, pp. 1-9.
48. R. Costanzi, D. Fennucci, V. Manzari, A. Caiti, R. Petroccia, Towards an Autonomous Underwater Vehicles Test Range: At-sea Experimentation of Bearing-Only Tracking Algorithms, in: Annual Reviews in Control, volume 46, 2018, pp. 304-314.
49. Evologics S2C acoustic modems, 2023. World Wide Web de domain evologics folder acoustic-modem file 18-34.
50. Lubell LL916 system, 2023. World Wide Web com domain lubell file LL916.html.
51. icListensmart hydrophones, 2023. World Wide Web com domain oceansonics folder product-types file iclisten-smart-hydrophones.
52. I. Politis, L. Dounis, T. Dagiuklas, H.264/SVC vs. H.264/AVC video quality comparison under QoE-driven seamless handoff, in: Signal Processing: Image Communication, volume 27, 2012, pp. 814-826.
53. USRP X Series, World Wide Web com domain ettus.
54. RESONTC4013 Hydrophone Product Information, 2023 World Wide Web com domain teledynemarine file reson-tc4013.
55. Multichannel hydrophone amplifiers, 2023. World Wide Web dk domain etec file hydrophone-amplifiers2.html.
56. NEW-RESON EC6081 mk2-preamplifier-Hydrophone Accessories-RESON, 2023. World Wide Web com domain teledynemarine file reson-ec6081.
57. M. Zoltowski, Equations for the raised cosine and square-root raised cosine shapes, in: Communication Systems Division, 2013.

What is claimed is:

1. A non-transitory computer-readable medium carrying one or more sequences of instructions for underwater communications, wherein execution of the one or more sequences of instructions by one or more processors causes the one or more processors to perform the steps of:

a. retrieving from a computer-readable medium first data that indicates a model that comprises a neural network encoder that outputs a value for a class of Modulating and Coding Schemes (MCS), which model is trained on a training set including for each instance an input value for a quality metric, an input value indicating one of a plurality of scalable video coding (SVC) structures for that quality metric, and an input value of acoustic channel information such that reconstructed video features based on the class of MCS output from the model are sufficiently similar to original video features for a particular purpose;

b. determining second data that indicates a current quality value for the quality metric and a current channel value for the acoustic channel information and a current SVC value indicating one of the plurality of SVC modules;

c. generating third data that indicates a current MCS value for the class of MCS, which value is output by the encoder of the first data operating on the second data; and d. causing a current video stream to be transmitted as an underwater acoustic signal based on the second data and the third data.

2. The non-transitory computer-readable medium as recited in claim 1, wherein said determining the current SVC value comprises determining the current SVC value based on the current quality value and the current channel value using a different encoder trained on the training set.

3. The non-transitory computer-readable medium as recited in claim 1, wherein step a and step b and step c is performed by an underwater receiver and said step d further comprises transmitting the current SVC value and the current MCS value to an underwater transmitter to cause the underwater transmitter to transmit the underwater acoustic signal.

4. The non-transitory computer-readable medium as recited in claim 1, wherein the original video features represent underwater video.

5. The non-transitory computer-readable medium as recited in claim 1, wherein each instance input value for acoustic channel information indicates an amplitude shift and phase shift for each of one or more frequency shifts from a carrier acoustic frequency.

6. The non-transitory computer-readable medium as recited in claim 1, wherein each instance input value for acoustic channel information indicates a numbered transceiver circuit tap for each of one or more frequency shifts from a carrier acoustic frequency.

7. An apparatus for underwater communications comprising:

an acoustic transceiver;

at least one processor; and at least one memory including one or more sequences of instructions, the at least one memory and the one or more sequences of instructions configured to, with the at least one processor, cause the apparatus to perform at least the following, a. retrieving from a computer-readable medium first data that indicates a model that comprises a neural network encoder that outputs a value for a class of Modulating and Coding Schemes (MCS), which model is trained on a training set including for each instance an input value for a quality metric, an input value indicating one of a plurality of a scalable video coding (SVC) structures for that quality metric, and an input value of acoustic channel information such that reconstructed video features based on the class of MCS output from the model are sufficiently similar to original video features for a particular purpose;

b. determining second data that indicates a current quality value for the quality metric and a current channel value for the acoustic channel information and a current SVC value indicating one of the plurality of SVC modules;

c. generating third data that indicates a current MCS value for the class of MCS, which value is output by the encoder of the first data operating on the second data; and d. causing a current video stream to be transmitted as an underwater acoustic signal based on the second data and the third data.

8. A system for underwater communications comprising two or more underwater devices each comprising the apparatus of claim 7.

9. A method for underwater acoustic communications, comprising:

a. training automatically on a processor a model that comprises a neural network encoder that outputs a value for a class of Modulating and Coding Schemes (MCS), which model is trained on a training set including for each instance an input value for a quality metric, an input value indicating one of a plurality of scalable video coding (SVC) structures for that quality metric, and an input value of acoustic channel information such that reconstructed video features based on the class of MCS output from the model are sufficiently similar to original video features for a particular purpose;

b. sending first data that indicates the model to a processor on an underwater device that comprises an underwater acoustic transceiver, wherein the underwater device is configured to perform at least the steps of:

i. determining second data that indicates a current quality value for the quality metric and a current channel value for the acoustic channel information and a current SVC value indicating one of the plurality of SVC modules;

ii. generating third data that indicates a current MCS value for the class of MCS, which value is output by the encoder of the first data operating on the second data; and iii. causing a current video stream to be transmitted as an underwater acoustic signal based on the second data and the third data.

10. A non-transitory computer-readable medium carrying one or more sequences of instructions for underwater communications, wherein execution of the one or more sequences of instructions by one or more processors causes the one or more processors to perform the steps of:

a. retrieving from a computer-readable medium first data that indicates a model that comprises a neural network encoder that outputs a value for a class of acoustic physical layer video protocol (AC), which model is trained on a training set including for each instance an input value for a quality metric, an input value indicating one of a plurality of application layer video coding (VC) structures for that quality metric, and an input value of acoustic channel information such that reconstructed video features based on the AC output from the model are sufficiently similar to original video features for a particular purpose;

b. determining second data that indicates a current quality value for the quality metric and a current channel value for the acoustic channel information and a current VC value indicating one of the plurality of VC structures;

c. generating third data that indicates a current AC value for the class of AC, which value is output by the encoder of the first data operating on the second data; and d. causing a current video stream to be transmitted as an underwater acoustic signal based on the second data and the third data.

* * * * *